(12) United States Patent
Ikushima et al.

(10) Patent No.: US 8,547,039 B2
(45) Date of Patent: Oct. 1, 2013

(54) CONDUCTIVE POLYMER ACTUATOR DEVICE, CONDUCTIVE POLYMER ACTUATOR CONTROL DEVICE AND CONTROL METHOD

(75) Inventors: Kimiya Ikushima, Osaka (JP); Sachio Nagamitsu, Kyoto (JP)

(73) Assignee: Panasonic Corporation, Osaka (JP)

( * ) Notice: Subject to any disclaimer, the term of this patent is extended or adjusted under 35 U.S.C. 154(b) by 462 days.

(21) Appl. No.: 13/055,958

(22) PCT Filed: Aug. 25, 2009

(86) PCT No.: PCT/JP2009/004089
§ 371 (c)(1),
(2), (4) Date: Jan. 26, 2011

(87) PCT Pub. No.: WO2010/023875
PCT Pub. Date: Mar. 4, 2010

(65) Prior Publication Data
US 2011/0133676 A1    Jun. 9, 2011

(30) Foreign Application Priority Data

Aug. 26, 2008    (JP) ................. 2008-216625

(51) Int. Cl.
*H02N 1/00*    (2006.01)
*A61F 2/70*    (2006.01)

(52) U.S. Cl.
USPC ............. 318/116; 310/308; 310/309

(58) Field of Classification Search
USPC ............ 318/116, 117, 558; 310/308, 309
See application file for complete search history.

(56) References Cited

U.S. PATENT DOCUMENTS

| | | | | |
|---|---|---|---|---|
| 4,868,447 | A  * | 9/1989 | Lee et al. | 310/328 |
| 6,236,143 | B1 * | 5/2001 | Lesieutre et al. | 310/331 |
| 6,343,129 | B1 * | 1/2002 | Pelrine et al. | 381/191 |
| 6,545,391 | B1 * | 4/2003 | Su et al. | 310/332 |
| 7,432,630 | B2 * | 10/2008 | Hunter et al. | 310/317 |
| 7,982,375 | B2 * | 7/2011 | Tan et al. | 310/338 |
| 2006/0238065 | A1 | 10/2006 | Ishibashi et al. | |

FOREIGN PATENT DOCUMENTS

| | | |
|---|---|---|
| JP | 2006-129541 | 5/2006 |
| JP | 2006-178386 | 7/2006 |
| JP | 2006-299842 | 11/2006 |
| JP | 2006-311630 | 11/2006 |
| JP | 2008-038660 | 2/2008 |

OTHER PUBLICATIONS

Translation of the International Preliminary Report on Patentability (Chapter II), issued Apr. 21, 2011, in PCT/JP2009/004089.
International Search Report issued Dec. 1, 2009 in International (PCT) Application No. PCT/JP2009/004089.

* cited by examiner

*Primary Examiner* — Bentsu Ro
(74) *Attorney, Agent, or Firm* — Wenderoth, Lind & Ponack, L.L.P.

(57) ABSTRACT

An actuator is provided with a conductive polymer film portion, an electrode, and an electrolyte portion, and by detecting a waveform of a current that flows upon application of a voltage between the conductive polymer film portion and the electrode, a displacement amount of the actuator is detected so that based on the displacement amount thus detected, a voltage is applied to the conductive polymer film portion so that the displacement amount of the actuator is adjusted.

8 Claims, 31 Drawing Sheets

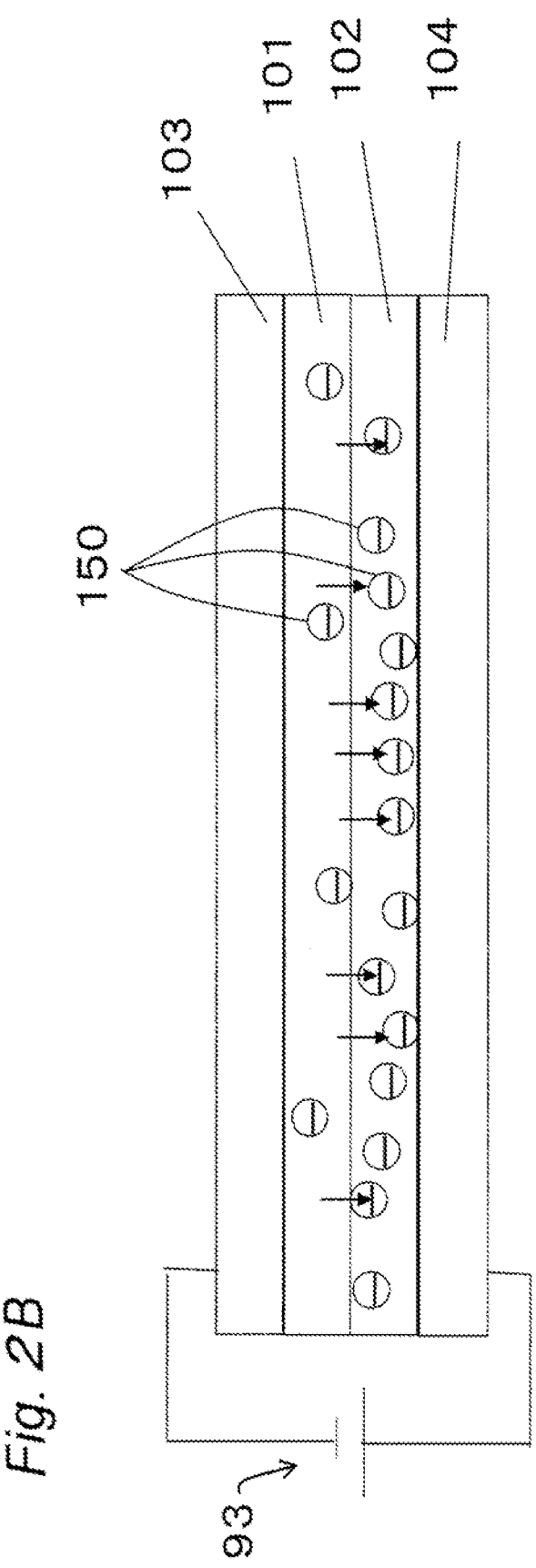

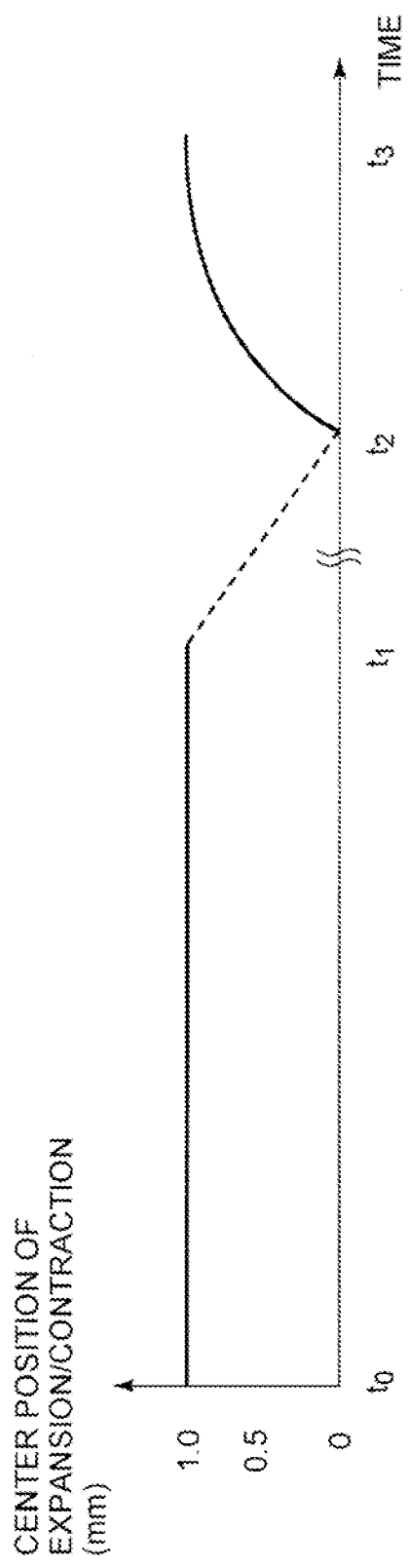

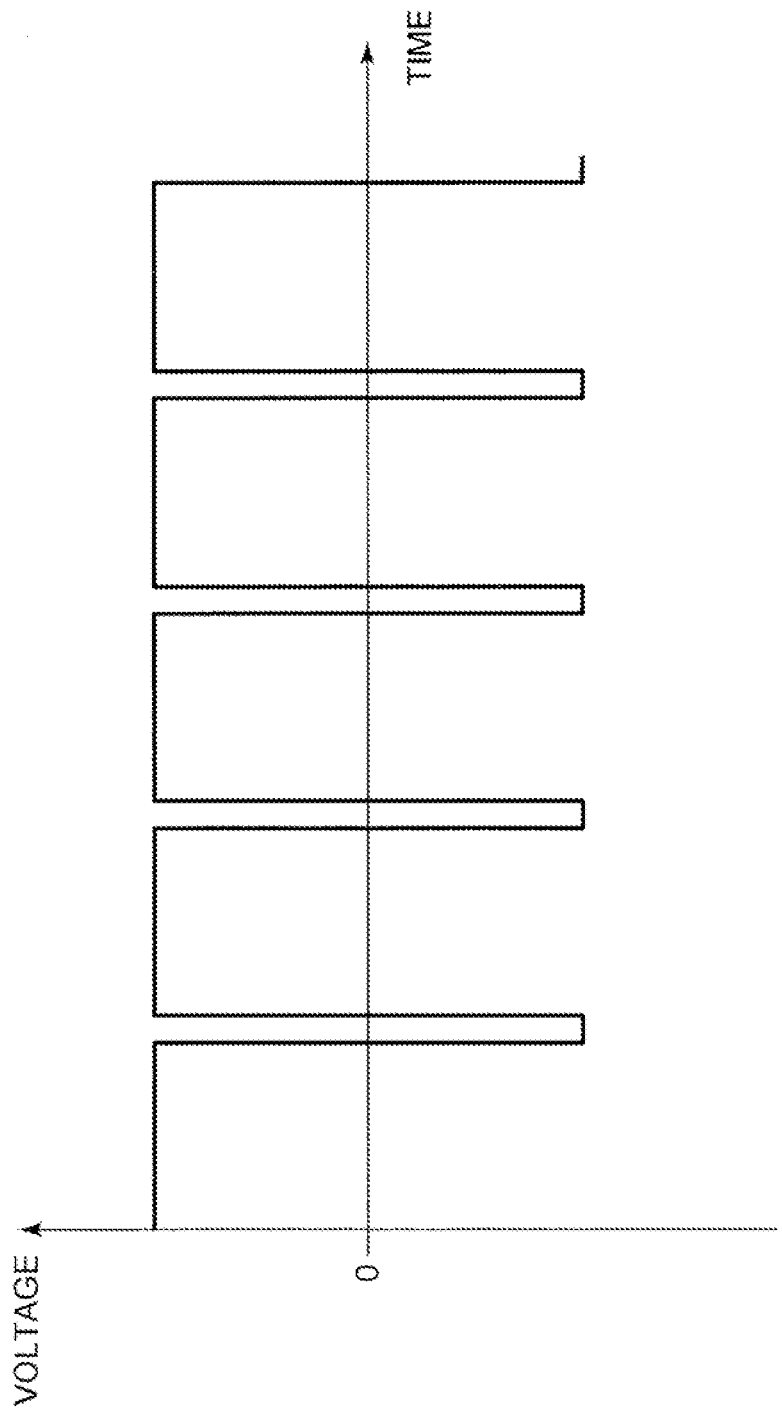

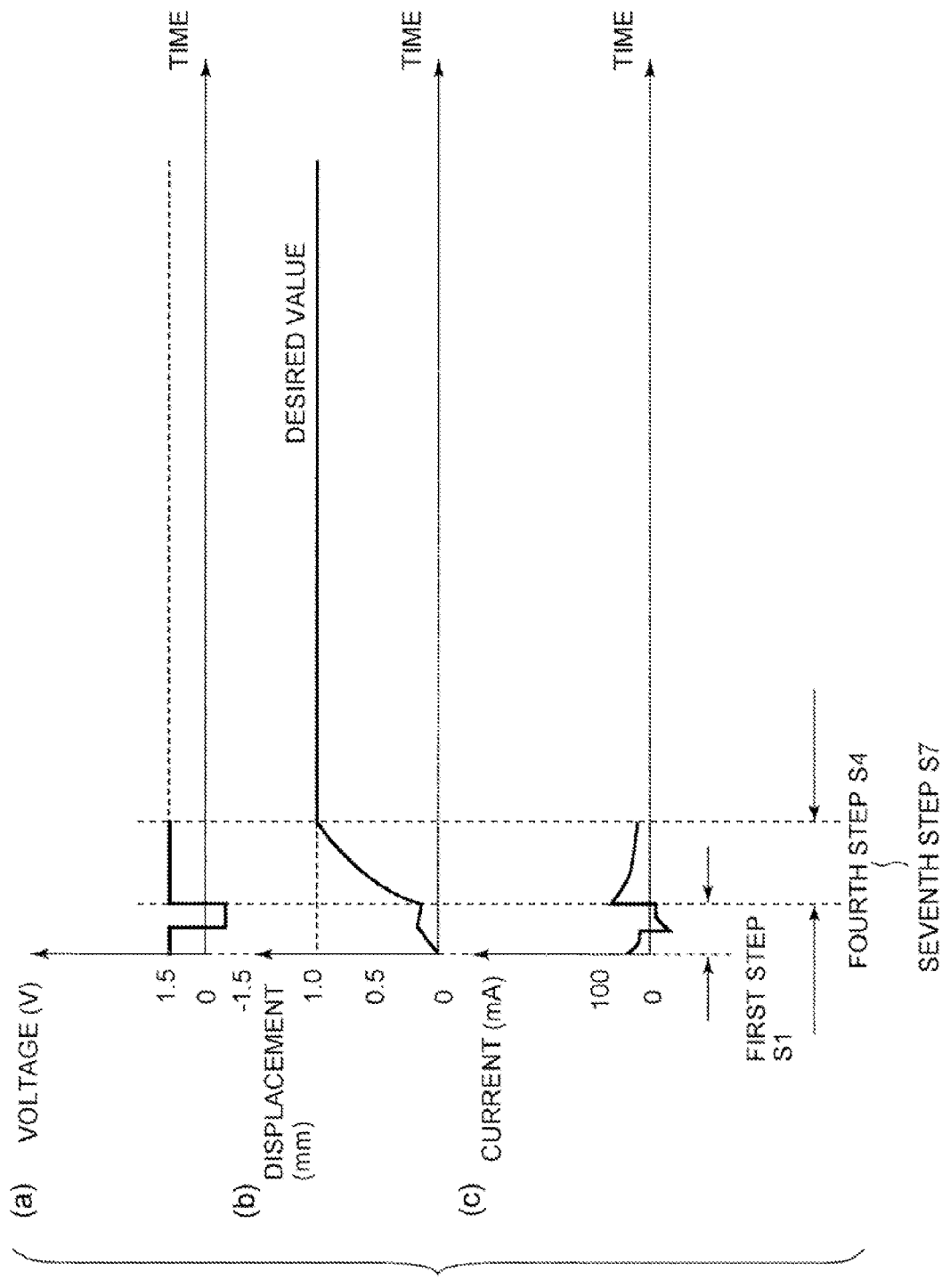

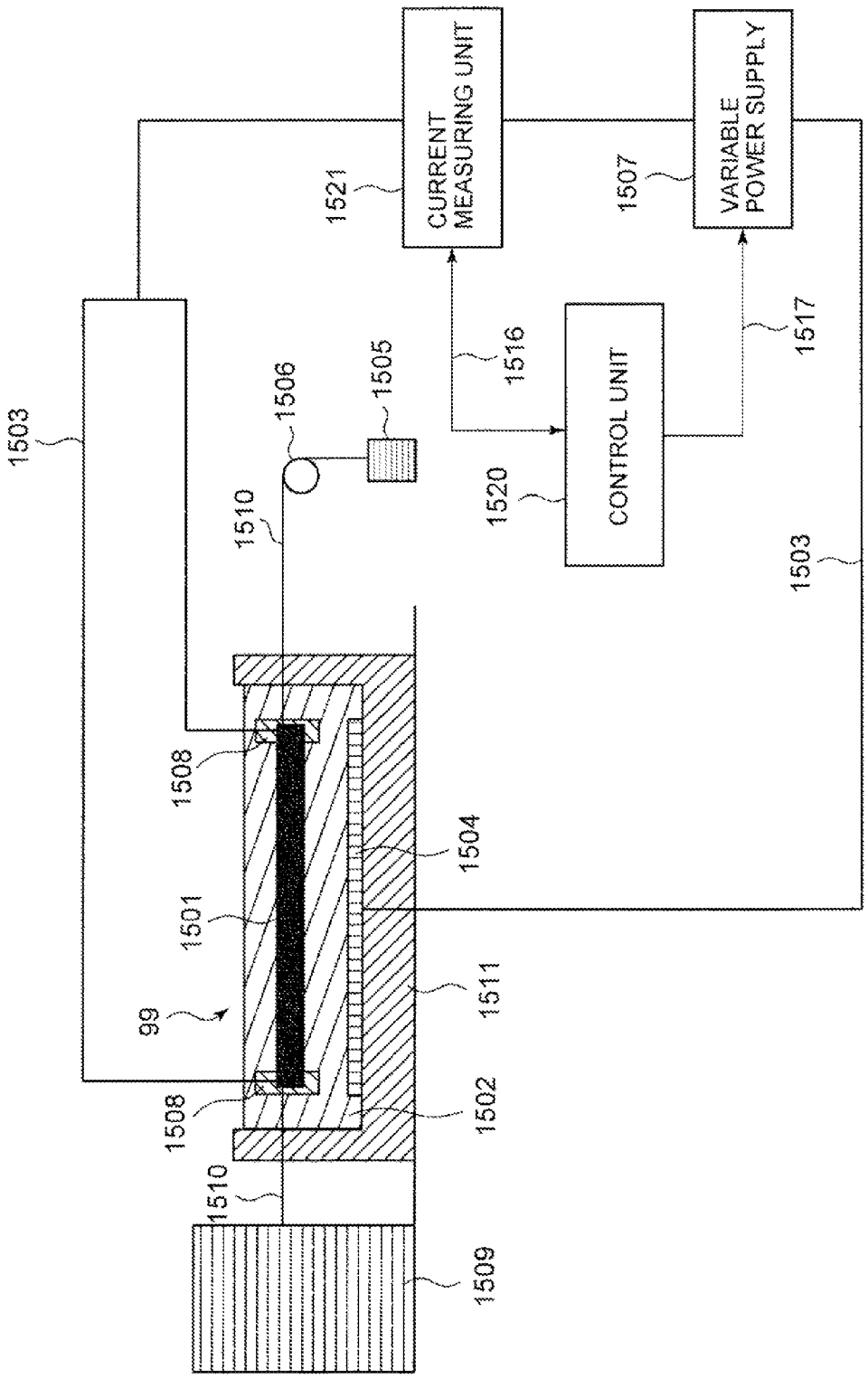

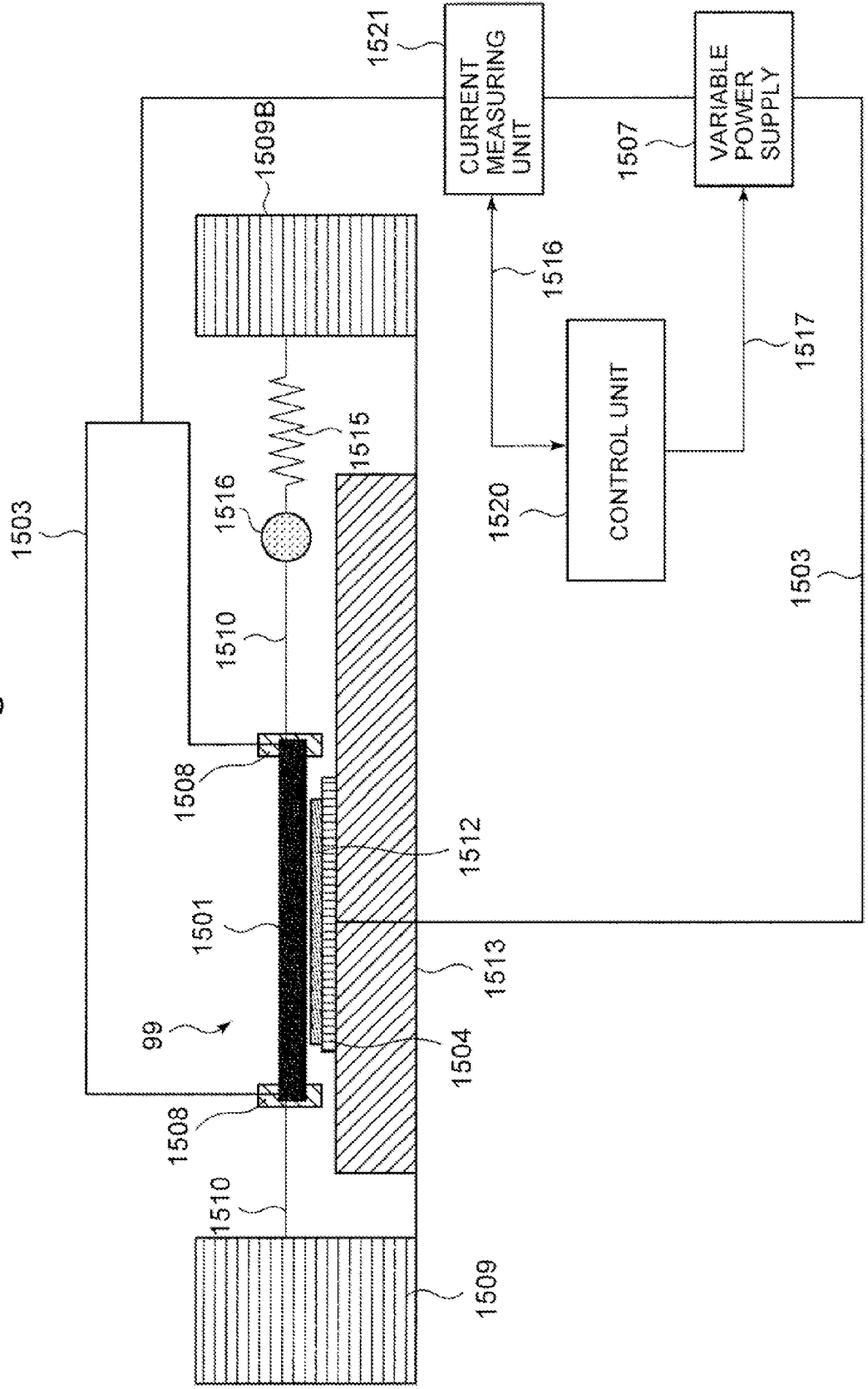

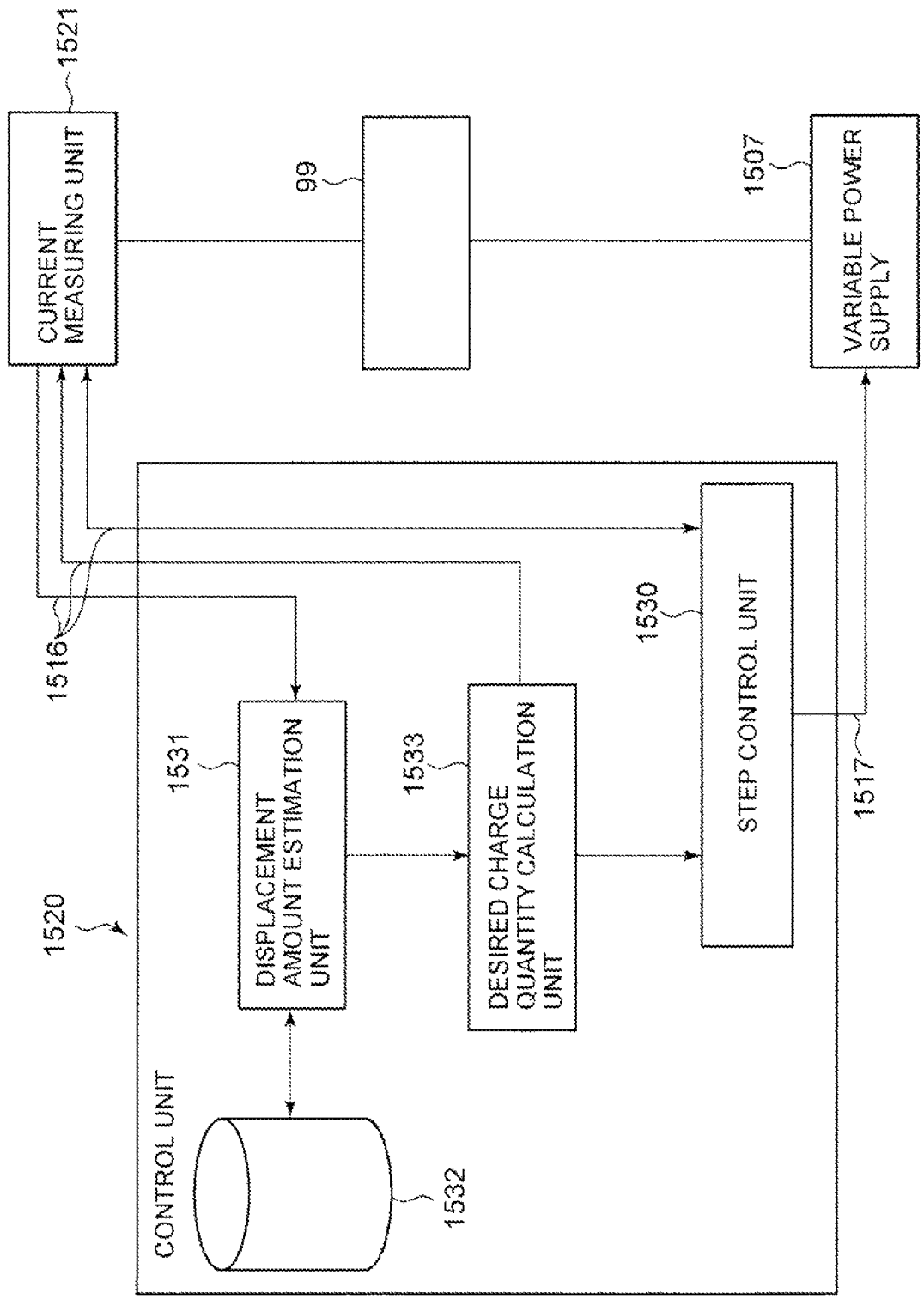

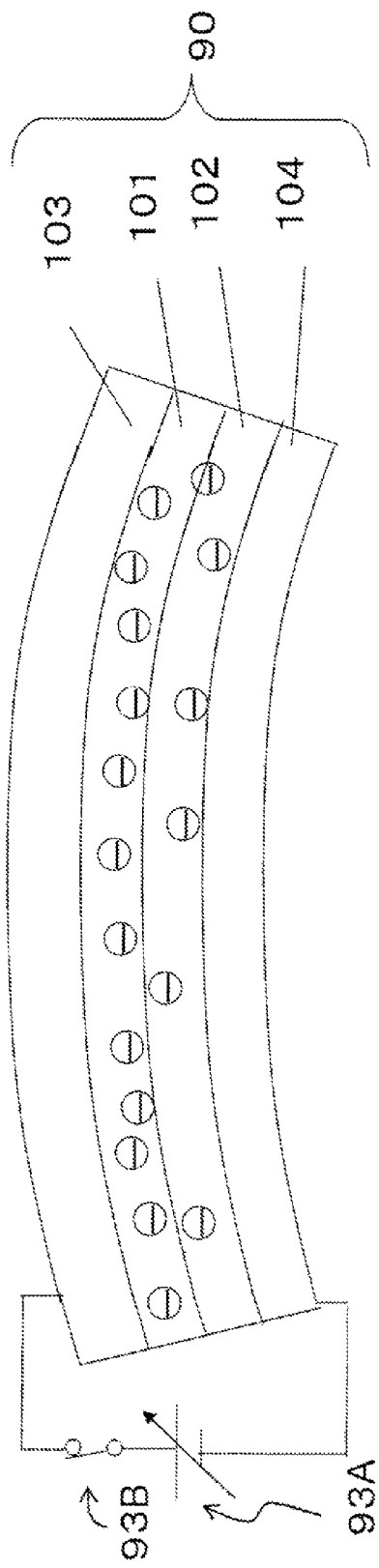
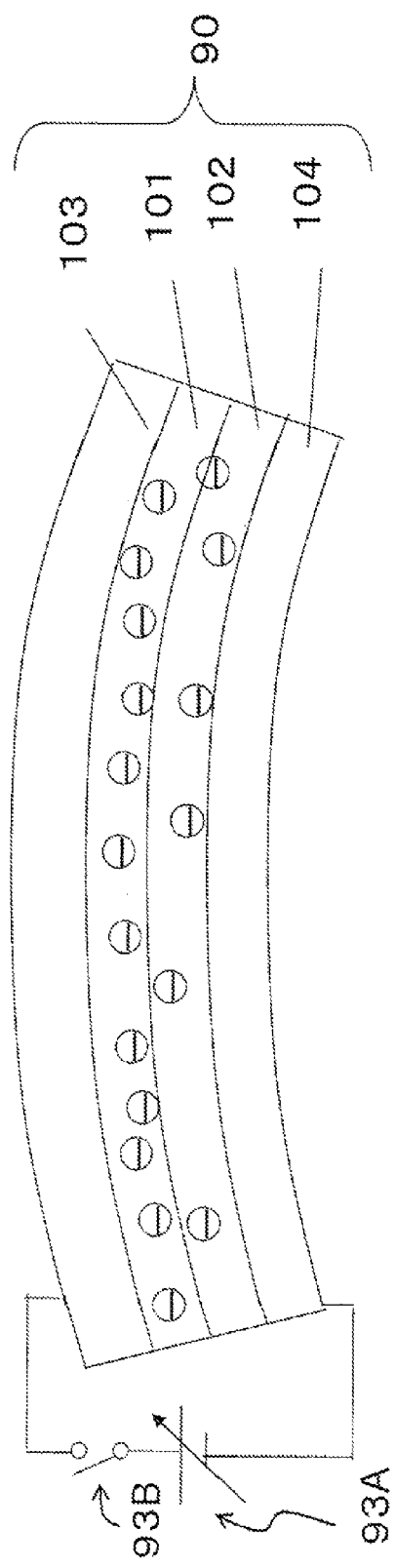

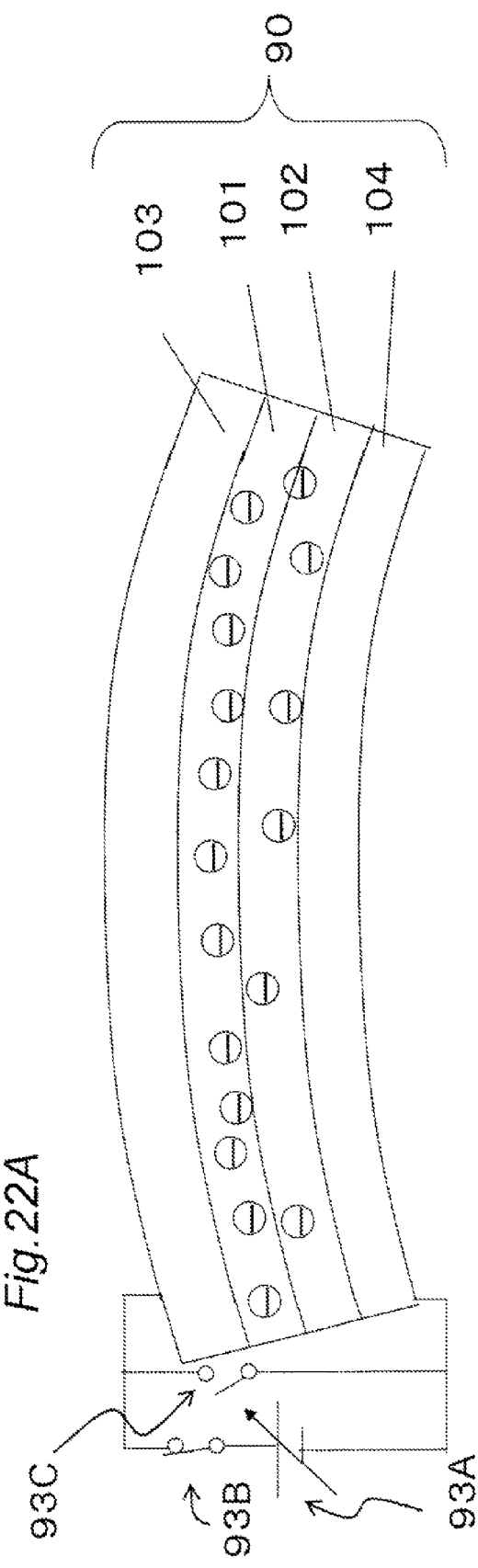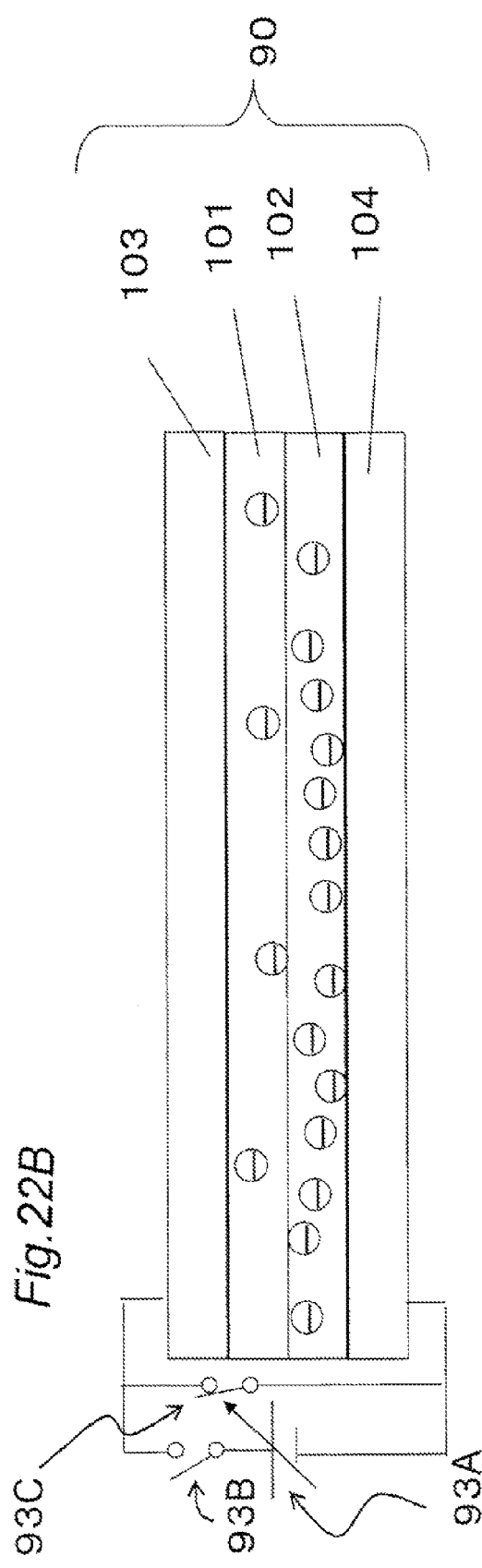

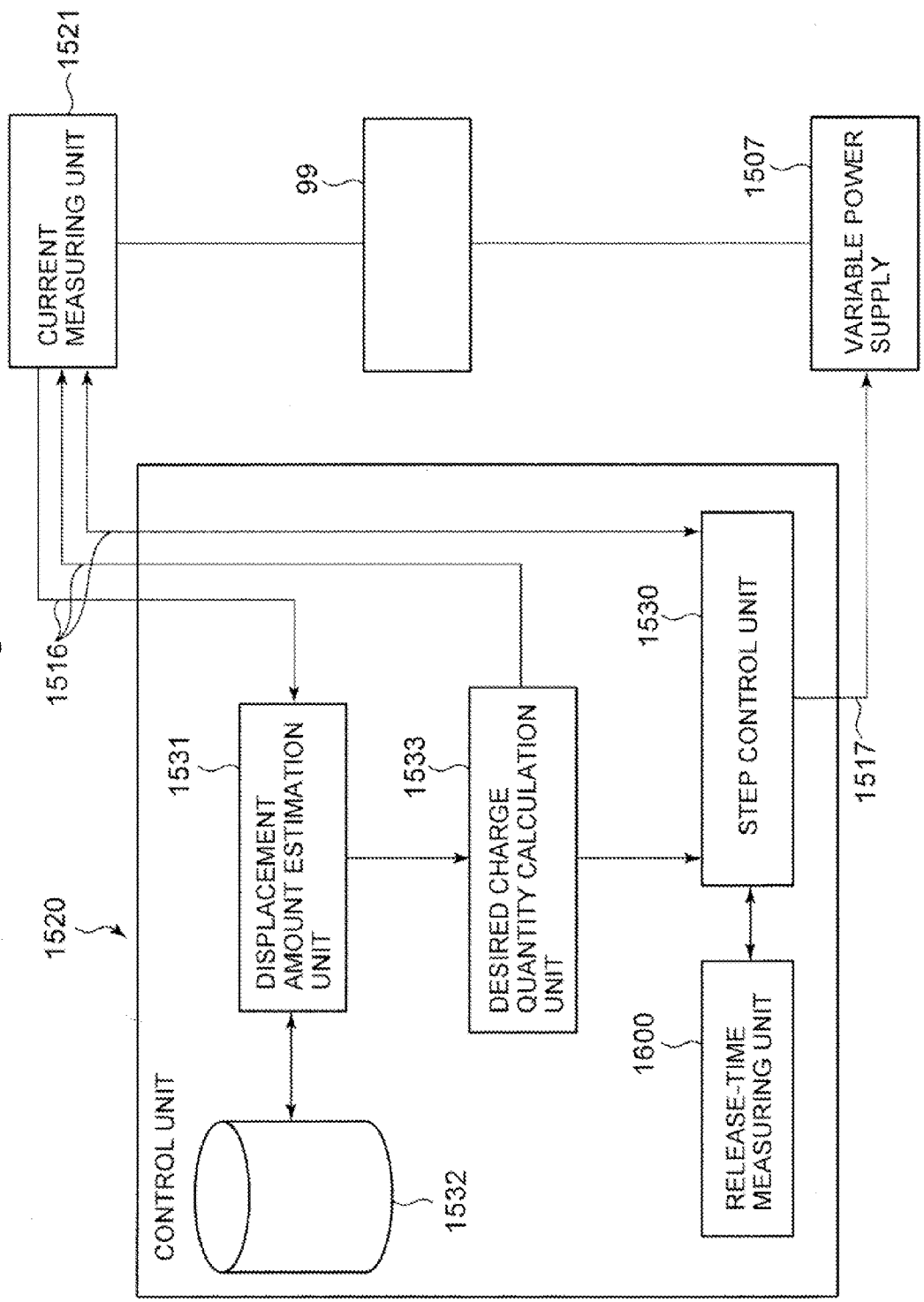

CONDUCTIVE POLYMER ACTUATOR DEVICE, CONDUCTIVE POLYMER ACTUATOR CONTROL DEVICE AND CONTROL METHOD

TECHNICAL FIELD

The present invention relates to a conductive polymer actuator device that is operated by using an electric signal, and is applicable to an artificial muscle, an electronic component, or the like, and also relates to a conductive polymer actuator control device and a control method for a conductive polymer actuator.

BACKGROUND ART

An actuator using a polymer as its element material has characteristics such as light weight, superior flexibility and no operation noise, and has been expected as a device for an operation mechanism such as an artificial muscle or a micro device. Among these, a device that uses a conductive polymer, such as polypyrrole or polyaniline, as a driving material so as to utilize its electrochemical expansion/contraction, has a possibility of generating energy that is greater than that of a biological muscle, and has been proposed as a polymer actuator device capable of providing practical device operations.

The operations of the actuator constituted by a conductive polymer are carried out in such a manner that, by applying a voltage or a current to the conductive polymer so as to dope or undope ions from an electrolyte to the conductive polymer, the conductive polymer is expanded/contracted so that a displacement for use in driving the device is generated.

One of the characteristics of the actuator formed by the conductive polymer to be operated by such a mechanism is a memory characteristic for displacement. That is, ions are allowed to enter the conductive polymer by an application of a voltage, and a state having a displacement caused by an expansion/contraction is maintained even after a voltage shut off. This phenomenon is caused by the fact that, since ions are hardly moved without applying a voltage thereto, ions inside the conductive polymer are not allowed to go out from the conductive polymer without an application of an electric potential with a reversed bias. With this characteristic, no energy is required to maintain the displacement of the actuator so that energy-saving operations can be obtained. Additionally, disconnecting a wire of a circuit constituted by a power supply and the actuator at any point is defined to be represented by "voltage is shut off".

In order to enhance the control precision of the conductive polymer actuator, it is indispensable to accurately detect a displacement state of the conductive polymer, that is, a length state thereof. That is, it is necessary to detect a change in length caused by an expansion/contraction of the conductive polymer, and also to control the operations while detecting positional information (displacement) of the driving portion. In this case, the actuator constituted by a conductive polymer has a characteristic in that, when a voltage is applied to the control electrode to cause the above-mentioned displacement, a memory characteristic is exerted. However, although ions located inside the conductive polymer are hardly released, a slight amount of ions tend to be released from the conductive polymer to be alleviated. Therefore, in the case where the controlling process is carried out only by the use of a driving voltage to be applied, since the displacement amount has its positional information deviated, the precision of controllability is lowered. Consequently, in order to control the conductive polymer actuator with high precision, it is necessary to detect the state of the conductive polymer by using a signal other than the driving voltage to be applied.

With respect to this detection, conventionally, a method has been proposed in which by detecting the electric conductivity of the conductive polymer, the length of the conductive polymer film is detected so as to carry out controlling processes (see Patent Document 1).

FIG. 20 shows a structure of a conductive polymer actuator described in Patent Document 1.

In FIG. 20, the device structure is designed such that a conductive polymer film portion 2401 made from a conductive polymer and an opposed electrode portion 2404 are made to face to face with each other, with an electrolyte portion 2402 made of a polymer solid electrolyte layer interposed therebetween, and by forming an inner field detection electrode 2405 so as to be in contact with the conductive polymer film portion 2401, a displacement state caused by the conductive polymer film portion 2401 is measured.

By applying a voltage between a control electrode 2403 and the opposed electrode 2404, this actuator is operated. The conductive polymer film portion 2401 and the electrolyte portion 2402 are made in face-to-face contact with each other. That is, the conductive polymer film portion 2401 is stacked on the electrolyte portion 2402.

In FIG. 20, the polymer actuator device is designed such that by applying a driving electric signal between the control electrode 2403 and the opposed electrode 2404, movable minus ions located in the electrolyte portion 2402 are allowed to enter a conductive polymer film in the conductive polymer film portion 2401, and electrochemically oxidized so that the conductive polymer film portion 2401 is expanded and the actuator is curved, thereby operating the actuator by this displacement. At this time, the conductive polymer film portion 2401 composed of the conductive polymer layer is doped by the oxidizing reaction of the movable ions so that it has high electron conductivity. In this case, the change in electric conductivity of the conductive polymer can be measured by a pair of inner field detection electrodes 2405 so that the displacement state of the entire actuator can be electrically monitored.

PRIOR ART DOCUMENT

Patent Document

Patent Document 1: Japanese Unexamined Patent Publication No. 2006-129541

SUMMARY OF THE INVENTION

Issues to be Resolved by the Invention

As described above, in order to enhance the precision of controlling operations of the actuator composed of a conductive polymer, it is indispensable to accurately detect the displacement state or the positional information or the like of the actuator. That is, it is necessary to detect the displacement caused by an expansion/contraction state of the conductive polymer, and also to carry out controlling processes, while detecting the information of the amount of change in the driving portion. As described above, the actuator, composed of a conductive polymer, has a characteristic (memory characteristic) in that, even if, after an application of a voltage to the conductive polymer to cause a displacement, the voltage is shut off, ions located inside the conductive polymer are hardly released so that the displacement is maintained substantially constant. However, since a slight amount of ions are released from the conductive polymer, with the voltage being shut off, the position tends to be slightly changed. In this case, when controlling processes are carried out only by the driving voltage to be applied, an issue arises in which the precision of controllability is lowered since the displacement amount has its positional information deviated. In particular, in the conductive polymer actuator, in the case where, after having been left for a long period of time with the driving voltage turned off, the application of the driving voltage is resumed, since the operation of the actuator is resumed from a position that is greatly different from the position before the turning-off of the driving voltage, it is difficult to carryout accurate controlling operations. In this case, disconnecting a wire of a circuit constituted by a power supply and the actuator at any point is defined to be represented by "voltage is turned off", or "voltage is shut off", or "voltage is released".

In the structure of Patent Document 1, by detecting a change in the electric conductivity caused by a change in the length of the conductive polymer, the length of the conductive polymer and the resulting change in the driving position of the actuator are detected. However, in this method, it is necessary to install an inner field detection electrode, resulting in an issue of a complicated structure.

Moreover, in some of conductive polymers, the electric conductivity is maintained substantially constant even in the case of a change in the length, the method of Patent Document 1 is not applicable. More specifically, in the case of actuators in which a conductive polymer is expanded/contracted (hereinafter, referred to as a cation-driving-type conductive polymer actuator) by incoming and outgoing plus ions (cations), some of them have hardly any change in the electric conductivity of the conductive polymer due to the incoming and outgoing ions. In this case, the method of Patent Document 1 cannot be applied.

Moreover, in the case of an anion-driving type conductive actuator, since the electric conductivity changes depending on a change in the length, the method of Patent Document 1 can be applied thereto; however, when ions go out from the conductive polymer (when undoped), the resistivity of the conductive polymer becomes greater. For this reason, energy losses in the conductive polymer become greater due to Joule heat. In order to reduce Joule heat in the conductive polymer, a control electrode made of metal may be installed as described in Patent Document 1; however, this method causes an issue of a complicated structure.

In order to resolve the above-mentioned conventional issues, the present invention has been devised, and in an electronic device using a conductive polymer actuator, an object of the present invention is to provide a conductive polymer actuator device with a simple structure and superior controllability, and a conductive polymer actuator control device and a control method for a conductive polymer actuator.

Means for Resolving the Issues

In order to achieve the above object, the present invention has the following structures:

According to a first aspect of the present invention, there is provided a control device for a conductive polymer actuator that allows a conductive polymer film portion, an electrolyte portion that is placed at a position in contact with the conductive polymer film portion, and an electrode that is placed at a position in contact with the electrolyte portion to constitute an actuator operation unit, comprising:

a displacement amount acquiring unit that, upon application of a voltage between the conductive polymer film portion and the electrode, at a predetermined timing after a voltage has been released between the conductive polymer film portion and the electrode, acquires a current value flowing through the conductive polymer film portion, and acquires a displacement amount of the actuator operation unit based on the acquired current value; and a displacement amount adjusting unit that adjusts the displacement amount of the actuator operation unit, based on the displacement amount of the actuator operation unit acquired by the displacement amount acquiring unit.

According to a fifth aspect of the present invention, there is provided a conductive polymer actuator device comprising:

a conductive polymer actuator that allows a conductive polymer film portion, an electrolyte portion that is placed at a position in contact with the conductive polymer film portion, and an electrode that is placed at a position in contact with the electrolyte portion to constitute an actuator operation unit;

a voltage applying unit that applies a voltage between the conductive polymer film portion and the electrode;

a release-time measuring unit that measures a period of time a state where the voltage is released between the conductive polymer film portion and the electrode;

a displacement amount acquiring unit that, in a case where the measured time of the release-time measuring unit exceeds a predetermined period of time, upon application of a voltage having a certain waveform between the conductive polymer film portion and the electrode by the voltage applying unit at a predetermined timing, acquires a current value flowing through the conductive polymer film portion, and acquires a displacement amount of the actuator operation unit based on the acquired current value; and a displacement amount adjusting unit that adjusts the displacement amount of the actuator operation unit based on the displacement amount of the actuator operation unit acquired by the displacement amount acquiring unit.

According to an eighth aspect of the present invention, there is provided a control method for a conductive polymer actuator that allows a conductive polymer film portion, an electrolyte portion that is placed at a position in contact with the conductive polymer film portion, and an electrode that is placed at a position in contact with the electrolyte portion to constitute an actuator operation unit, comprising:

upon applying a voltage between the conductive polymer film portion and the electrode at a predetermined timing after a voltage has been released between the conductive polymer film portion and the electrode, acquiring a current value flowing through the conductive polymer film portion, and then allowing a displacement amount acquiring unit to acquire a displacement amount of the actuator operation unit based on the acquired current value; and finding a difference between the displacement amount of the actuator operation unit thus acquired and a desired value of the displacement amount, and then applying a voltage determined based on the difference, between the conductive polymer film portion and the electrode so as to allow a displacement amount adjusting unit to adjust the displacement amount of the actuator.

Effects of the Invention

According to the conductive polymer actuator, the conductive polymer actuator device, and the control method of the present invention, it becomes possible to detect a displacement of the conductive polymer actuator by using a simple structure, and also to accurately adjust the displacement to a desired value by using the detection result.

BRIEF DESCRIPTION OF THE DRAWINGS

These and other aspects and features of the present invention will become clear from the following description taken in conjunction with the preferred embodiments thereof with reference to the accompanying drawings, in which:

FIG. 2B is a view that shows the operation principle of the conductive polymer actuator according to the first embodiment;

FIG. 4B is a view that schematically shows a relationship between a center position of expansion/contraction and time, in the conductive polymer actuator according to the first embodiment;

FIG. 7 is a view that shows a state in which a period of time during which a positive voltage having a rectangular waveform, as an example of a driving voltage waveform, is applied is made longer;

FIG. 10 is a view that shows an example of time-based changes among the driving voltage, the displacement amount of the actuator, and the current value in the first embodiment;

FIG. 16A is a structural view that shows one example of a conductive polymer actuator device that executes an operation in a direct-acting direction in a control method for a conductive polymer actuator according to a second embodiment of the present invention;

FIG. 16C is a structural view that shows still another example of the conductive polymer actuator device that executes an operation in the direct-acting direction in the control method for the conductive polymer actuator according to the second embodiment of the present invention;

FIG. 17 is a view that shows a specific structure of a control unit of the conductive polymer actuator according to the second embodiment of the present invention;

FIG. 21A is a view that schematically shows a structural example of a conductive polymer actuator according to one embodiment of the present invention;

FIG. 21B is a schematic view that shows a state in which in the structural example of the conductive polymer actuator according to the embodiment of the present invention of FIG. 21A, a switch is opened;

FIG. 22A is a view that schematically shows a structural example of the conductive polymer actuator according to the embodiment of the present invention;

FIG. 22B is a schematic view that shows a state in which two switches have been switched over, in the structural example of the conductive polymer actuator according to the embodiment of the present invention of FIG. 22A;

FIG. 24 is a block diagram that shows another control method utilizing a release-time measuring unit, which is carried cut in a conductive polymer actuator according to still another embodiment of the present invention.

BEST MODE FOR CARRYING OUT THE INVENTION

Figure 1:
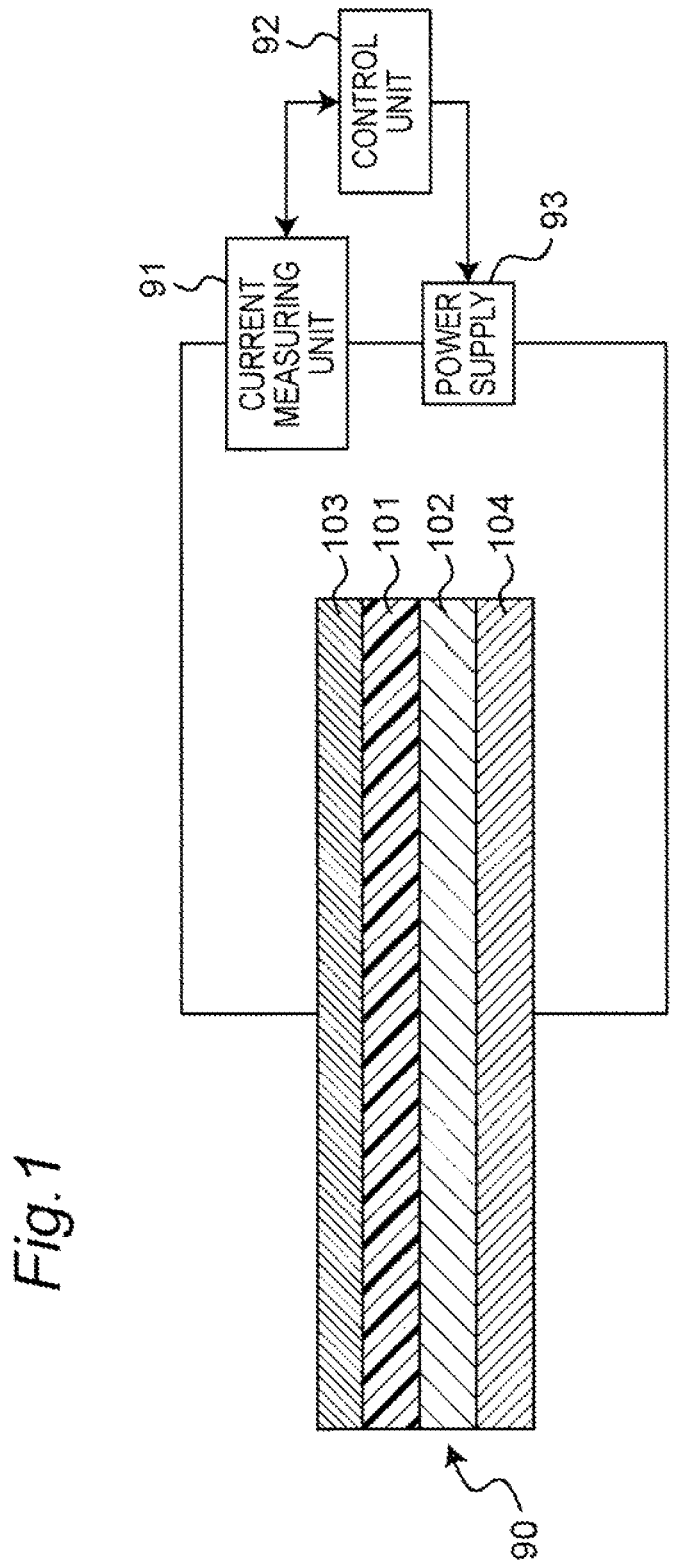
FIG. 1 is a view that shows a conductive polymer actuator device and includes a schematic cross-sectional view of a conductive polymer actuator according to a first embodiment of the present invention.

Referring to the drawings, the following description will discuss embodiments of the present invention in detail.

Prior to describing embodiments of the present invention in detail with reference to the drawings, the following description will discuss various modes of the present invention.

According to a first aspect of the present invention, there is provided a control device for a conductive polymer actuator that allows a conductive polymer film portion, an electrolyte portion that is placed at a position in contact with the conductive polymer film portion, and an electrode that is placed at a position in contact with the electrolyte portion to constitute an actuator operation unit, comprising:

a displacement amount acquiring unit that, upon application of a voltage between the conductive polymer film portion and the electrode, at a predetermined timing after a voltage has been released between the conductive polymer film portion and the electrode, acquires a current value flowing through the conductive polymer film portion, and acquires a displacement amount of the actuator operation unit based on the acquired current value; and a displacement amount adjusting unit that adjusts the displacement amount of the actuator operation unit, based on the displacement amount of the actuator operation unit acquired by the displacement amount acquiring unit.

According to a second aspect of the present invention, there is provided the control device for a conductive polymer actuator according to the first aspect, wherein the displacement amount acquiring unit comprises:

a current detection unit that, in a case where, upon starting a voltage application between the conductive polymer film portion and the electrode, a voltage having a certain waveform is applied between the conductive polymer film portion and the electrode, detects a current value flowing through the conductive polymer film portion; and a displacement amount calculation unit that calculates a displacement amount of the actuator operation unit based on the current value detected by the current detection unit.

According to a third aspect of the present invention, there is provided the control device for a conductive polymer actuator according to the first aspect, wherein the displacement amount acquiring unit comprises:

a current detection unit that, in a case where, while a voltage is released between the conductive polymer film portion and the electrode, a voltage having a certain waveform is applied between the conductive polymer film portion and the electrode for every certain fixed period of time, detects a current value flowing through the conductive polymer film portion; and a displacement amount calculation unit that calculates a displacement amount of the actuator operation unit based on the current value detected by the current detection unit.

According to a fourth aspect of the present invention, there is provided the control device for a conductive polymer actuator according to the first aspect, wherein, when a continuous period of time of the voltage released state exceeds a fixed period of time, the displacement amount acquiring unit applies a voltage between the conductive polymer film portion and the electrode at a predetermined timing thereafter, and detects a current value flowing through the conductive polymer film portion so that, based on the detected current value, a displacement amount of the actuator operation unit is acquired.

According to a fifth aspect of the present invention, there is provided a conductive polymer actuator device comprising:

a conductive polymer actuator that allows a conductive polymer film portion, an electrolyte portion that is placed at a position in contact with the conductive polymer film portion, and an electrode that is placed at a position in contact with the electrolyte portion to constitute an actuator operation unit;

a voltage applying unit that applies a voltage between the conductive polymer film portion and the electrode;

a release-time measuring unit that measures a period of time a state where the voltage is released between the conductive polymer film portion and the electrode;

a displacement amount acquiring unit that, in a case where the measured time of the release-time measuring unit exceeds a predetermined period of time, upon application of a voltage having a certain waveform between the conductive polymer film portion and the electrode by the voltage applying unit at a predetermined timing, acquires a current value flowing through the conductive polymer film portion, and acquires a displacement amount of the actuator operation unit based on the acquired current value; and a displacement amount adjusting unit that adjusts the displacement amount of the actuator operation unit based on the displacement amount of the actuator operation unit acquired by the displacement amount acquiring unit.

According to a sixth aspect of the present invention, there is provided the conductive polymer actuator device according to the fifth aspect, wherein the displacement amount adjusting unit comprises:

a displacement amount estimation unit that, based on the current value acquired by the displacement amount acquiring unit, estimates the displacement amount of the actuator by reference to a displacement amount/charge quantity conversion value preliminarily stored in a current value/displacement amount conversion table;

a desired charge quantity calculation unit that calculates a difference between the displacement amount estimated by the displacement amount estimation unit and a desired value of the displacement amount, and then calculates a desired charge quantity from the difference in the displacement amount thus calculated; and an application control unit that, based on the desired charge quantity calculated by the desired charge quantity calculation unit, controls the voltage applying device to apply a voltage so that the displacement amount of the actuator is adjusted.

According to a seventh aspect of the present invention, there is provided the conductive polymer actuator device according to the fifth aspect, wherein the desired charge quantity calculation unit of the displacement amount estimation unit calculates the charge quantity by integrating the current value acquired by the displacement amount acquiring unit.

According to an eighth aspect of the present invention, there is provided a control method for a conductive polymer actuator that allows a conductive polymer film portion, an electrolyte portion that is placed at a position in contact with the conductive polymer film portion, and an electrode that is placed at a position in contact with the electrolyte portion to constitute an actuator operation unit, comprising:

upon applying a voltage between the conductive polymer film portion and the electrode at a predetermined timing after a voltage has been released between the conductive polymer film portion and the electrode, acquiring a current value flowing through the conductive polymer film portion, and then allowing a displacement amount acquiring unit to acquire a displacement amount of the actuator operation unit based on the acquired current value; and finding a difference between the displacement amount of the actuator operation unit thus acquired and a desired value of the displacement amount, and then applying a voltage determined based on the difference, between the conductive polymer film portion and the electrode so as to allow a displacement amount adjusting unit to adjust the displacement amount of the actuator.

Referring to the drawings, the following description will discuss embodiments of the present invention; however, the present invention is not intended to be limited by these.

First Embodiment

The following description will discuss a conductive polymer actuator device and a method for controlling the conductive polymer actuator according to a first embodiment of the present invention.

<Entire Structure of Actuator>

FIG. 1 is a view that shows an actuator device that executes the method for controlling the conductive polymer actuator according to the first embodiment of the present embodiment, and also includes a schematic cross-sectional view of the actuator.

The actuator device of FIG. 1 is provided with a conductive polymer film portion 101, an electrolyte portion 102, a control electrode 103, an opposed electrode unit 104, a current measuring unit 91, a control unit 92, and a power supply 93 serving as one example of a voltage applying unit. The control electrode 103, the conductive polymer film portion 101, the electrolyte portion 102, and the opposed electrode unit 104 are stacked in this order to configure an actuator operation unit 90. That is, the actuator device includes a structure in which the conductive polymer film portion 101 and the opposed electrode unit 104 are disposed face to face with each other, with the electrolyte portion 102 composed of a polymer solid electrolyte layer being interposed therebetween. In general, the actuator using the conductive polymer includes an electrolyte that is made in contact with the conductive polymer and an electrode that is made in contact with the electrolyte, and a voltage is applied between the conductive polymer and the electrode to generate incoming and outgoing ions to and from the conductive polymer so that an operation is carried out. In an example shown in FIG. 1, a voltage is applied between the conductive polymer film and the opposed electrode so as to carry out an operation, and, as will be described later, another method is proposed in which the opposed electrode and a reference electrode are disposed so that a voltage is applied between the conductive polymer and the reference electrode. Moreover, the other method is proposed in which a plurality of opposed electrodes are disposed. Moreover, in the example of FIG. 1, the control electrode is disposed at a position that is made in contact with the conductive polymer film; however, in the case where the conductivity of the conductive polymer is sufficiently high, a structure without the control electrode placed therein may be proposed.

Figure 23:
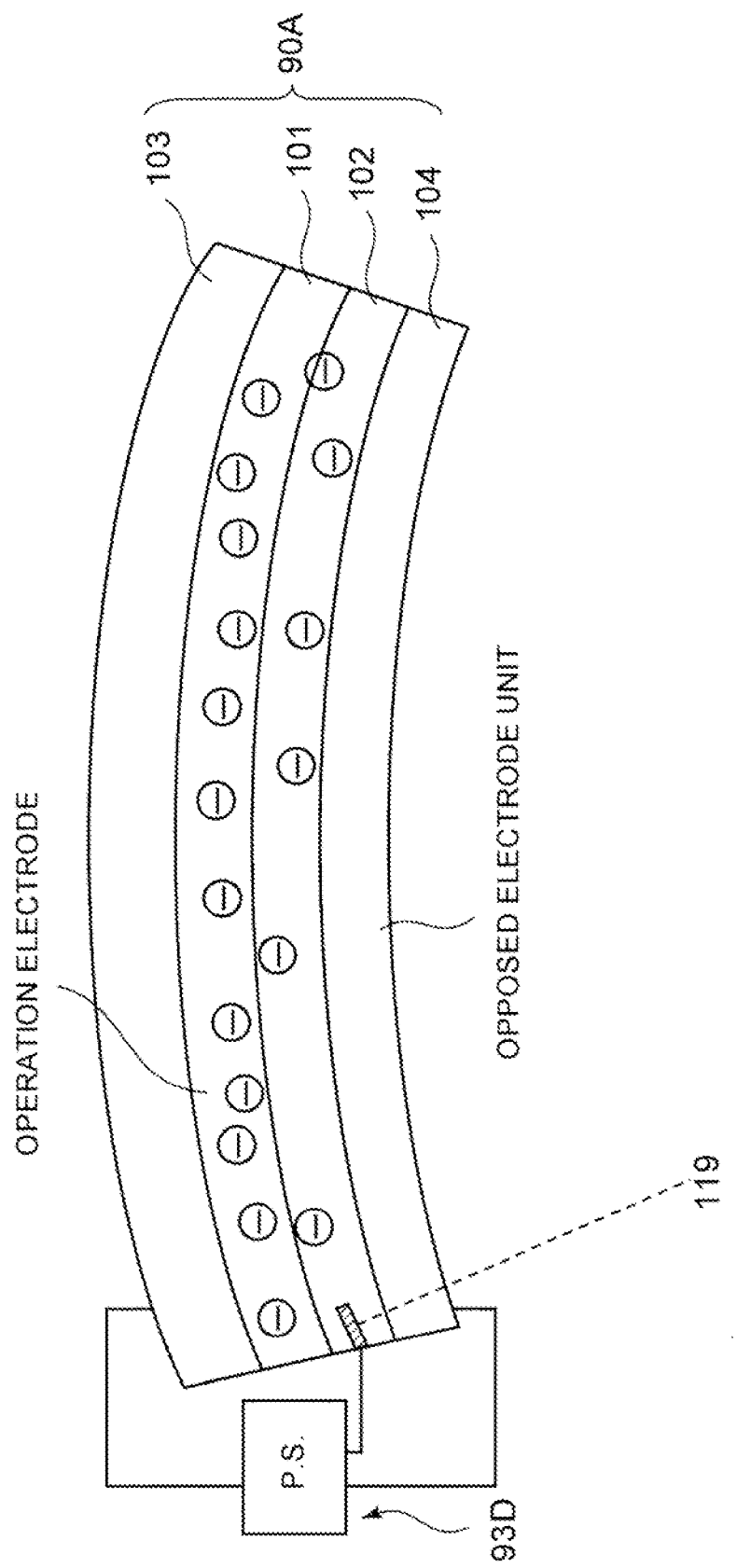
FIG. 23 is a view that schematically shows a structural example of a conductive polymer actuator according to another embodiment of the present invention.

Moreover, as shown in FIG. 23, the conductive polymer film portion 101 functioning as an operation electrode, the opposed electrode unit 104, and a reference electrode 119 are arranged in an actuator operation unit 90A, and this is connected to a potentiostat device (indicated by P.S. in the Figure) 93D so that the actuator can be operated. Any of the operation electrode (conductive polymer film portion 101), the reference electrode 119, and the opposed electrode 104 are arranged at such positions as to be made in contact with the electrolyte portion 102. The structure that uses the operation electrode (conductive polymer film portion 101), the reference electrode 119, and the opposed electrode 104 is a generally-used structure in the field of electrochemistry, and detailed descriptions thereof will be omitted. In the structure using the operation electrode (conductive polymer film portion 101), the reference electrode 119, and the opposed electrode 104, by applying a voltage between the operation electrode (conductive polymer film portion 101) and the reference electrode 119 by the use of the potentiostat device 93D, the actuator can be operated.

The current measuring unit 91 measures a current flowing between the power supply 93 and the control electrode 103.

Based on the result of measurements of the current measuring unit 91, the control unit 92 controls the voltage of the power supply 93.

The operations of the current measuring unit 91 and the control unit 92 will be described later in detail.

The actuator operation unit 90 is configured by the conductive polymer film portion 101, the electrolyte portion 102, the control electrode 103, and the opposed electrode unit 104, and as will be described later, the actuator operation unit 90 is operated by applying a voltage between the conductive polymer film portion 101 and the opposed electrode unit 104. As clearly shown in FIG. 1, the conductive polymer film portion 101 and the electrolyte portion 102 are made in face-to-face contact with each other. That is, the conductive polymer film portion 101 is stacked on the electrolyte portion 102. Moreover, in the example of FIG. 1, the conductive polymer film portion 101 is in contact with the control electrode 103 so that, by applying a voltage between the control electrode 103 and the opposed electrode unit 104, a voltage is indirectly applied between the conductive polymer film portion 101 and the opposed electrode unit 104. As described above, a structure from which the control electrode 103 is omitted may also be proposed, and in this case, a voltage can be directly applied between the conductive polymer film portion 101 and the opposed electrode unit 104.

<Material Components Forming Actuator Operation Unit 90>

The conductive polymer film portion 101 is formed by a conductive polymer film made from a material containing, for example, polypyrrole, polythiophene, polyaniline, and a derivative thereof, or a copolymer of these. In particular, the conductive polymer film portion 101 is preferably prepared as a conductive polymer film of a (co)polymer composed of polypyrrole, polythiophene, poly-N-methylpyrrole, poly-3-methylthiophene, poly-3-methoxythiophene, and poly-3,4-ethylene dioxythiophene, or one kind or two kinds of materials selected from these.

Any of these conductive polymer films are used, with negative ions (anions), such as phosphoric acid hexafluoride ions ($PF_6^-$), p-phenol sulfonic acid ions (PPS), dodecylbenzene sulfonic acid ions (DBS), or polystyrene sulfonic acid ions (PPS), being doped therein.

For example, the conductive polymer film portion 101 is composed of a polypyrrole layer (thickness: about 5 μm) that is electrolytically polymerized, and the electrolyte portion 102 is composed of a polymer solid electrolyte layer (thickness: about 10 μm) mainly composed of polyethylene oxide in which 10% by weight of sodium hexafluorophosphate has been dissolved, and the control electrode 103 and the opposed electrode unit 104 are respectively formed by gold electrodes; thus, the actuator operation unit 90 is constituted by these stacked members.

The film thickness of the conductive polymer film portion 101 may be set in a range, for example, from about 1 μm to about 100 µm, in particular more preferably, from about 5 µm to about 20 µm. The conductive polymer film portion 101 may be prepared by processes in which, after a synthesizing process by a chemical polymerization or an electrolytic polymerization, the resulting film is subjected to a molding process, if necessary. In the case where the film thickness of the conductive polymer film portion 101 is smaller than 1 µm, becomes difficult to carry out assembling processes for the actuator, since the mechanical strength of the film is too small. Moreover, in the case where the film thickness of the conductive polymer film portion 101 is larger than 100 µm, since incoming and outgoing ions are generated only in the vicinity of the film surface, a problem is raised in that the amount of expansion/contraction caused by electric field of the conductive polymer film portion 101 becomes smaller.

<Operation Principle of Conductive Polymer Actuator>

In general, in the actuator using a conductive polymer film, deforming operations are carried out by utilizing expansion/contraction deformations caused by allowing anions (negative ions) or cations (positive ions) to be doped or undoped with or from the conductive polymer.

For example, in a certain kind of material system in which, for example, polypyrrole, electrolytically polymerized in an aqueous solution of polyphenol sulfonic acid (PPS), is used as the conductive polymer, and this is operated in an aqueous solution of sodium phosphoric acid hexafluoride Na(NaPF$_6$), doping and undoping processes of anions are considered to mainly form a deformation mechanism. Moreover, for example, in another material system in which, for example, polypyrrole, electrolytically polymerized in a propylene carbonate (PC) solution of tetrabutylammonium phosphoric acid hexafluoride (TBA.PF$_6$), is used as the conductive polymer, and this is operated in ethylmethyl imidazolium.trifluoromethane sulfonyl imide (EMI.TFSI) serving as an ionic solution, doping and undoping processes of cations are considered to mainly form a deformation mechanism.

In the case where the doping and undoping processes of anions mainly form the deformation mechanism, the conductivity of the conductive polymer film is lowered in a undoped state of anions. For this reason, in order to efficiently operate the conductive polymer actuator, it is necessary to install a control electrode used for applying a driving voltage to the conductive polymer film, as described in Patent Document 1. In contrast, in the case where the doping and undoping processes of cations mainly form the deformation mechanism, since the conductivity of the conductive polymer film is allowed to maintain a comparatively high conductivity even in a undoped state of cations; therefore, it is possible to directly apply a driving voltage to the conductive polymer film. In the first embodiment, the following description is given by exemplifying the structure in which the doping and undoping processes of anions mainly form the deformation mechanism.

Figure 2A:
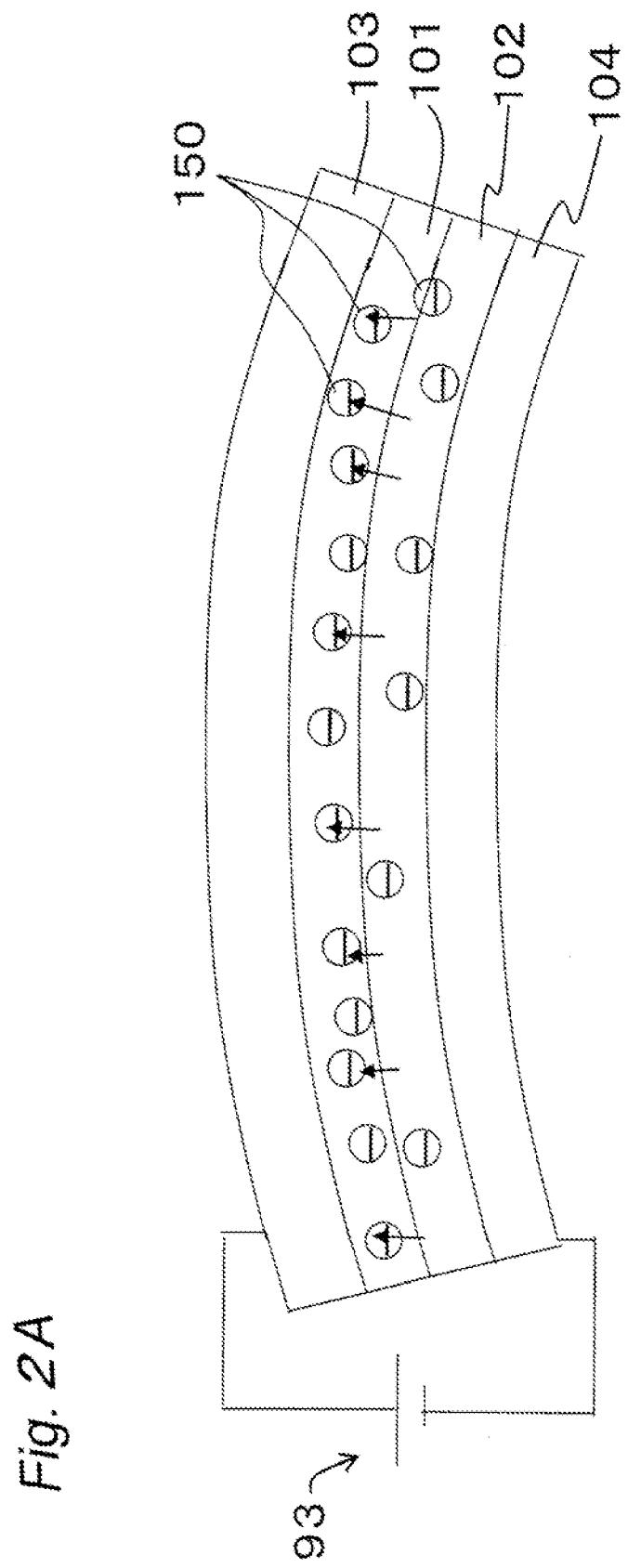
FIG. 2A is a view that shows an operation principle of the conductive polymer actuator according to the first embodiment.

First, referring to FIGS. 2A and 2B, the following description will discuss the operation principle of the conductive polymer actuator of FIG. 1.

As shown in FIG. 2A, by applying a driving voltage of a positive value between the conductive polymer film portion 101 and the opposed electrode unit 104 from the power supply 93 under control of the control unit 92, movable minus ions (movable anions) 150 that exist in the electrolyte portion 102 move in an incoming direction into the conductive polymer film of the conductive polymer film portion 101 from the outside. Thus, the movable anions 150 and the conductive polymer film have an oxidizing reaction so that the conductive polymer film portion 101 is expanded, thereby allowing the actuator operation unit 90 to be curved.

In contrast, in the case where, as shown in FIG. 23, a driving voltage of a negative value is applied between the conductive polymer film portion 101 and the control electrode 103 from the power supply 93 under control of the control unit 92, movable minus ions (movable anions) 150 that exist in the electrolyte portion 102 move in an outgoing direction so as to come out of the conductive polymer film of the conductive polymer film portion 101. Thus, the movable anions 150 and the conductive polymer film have a reducing reaction so that the conductive polymer film portion 101 is contracted, thereby bringing the actuator operation unit 90 into a substantially linear state.

In the above description, the driving electric signal is defined as a voltage to be applied to the conductive polymer film portion 101, with the opposed electrode unit 104 serving as a reference. It is considered that the reasons for expansion/contraction of the conductive polymer film are mainly because bulky ions are coming into or going out of the conductive polymer film.

<General Operation Characteristics of Conductive Polymer Actuator>

Figure 3:
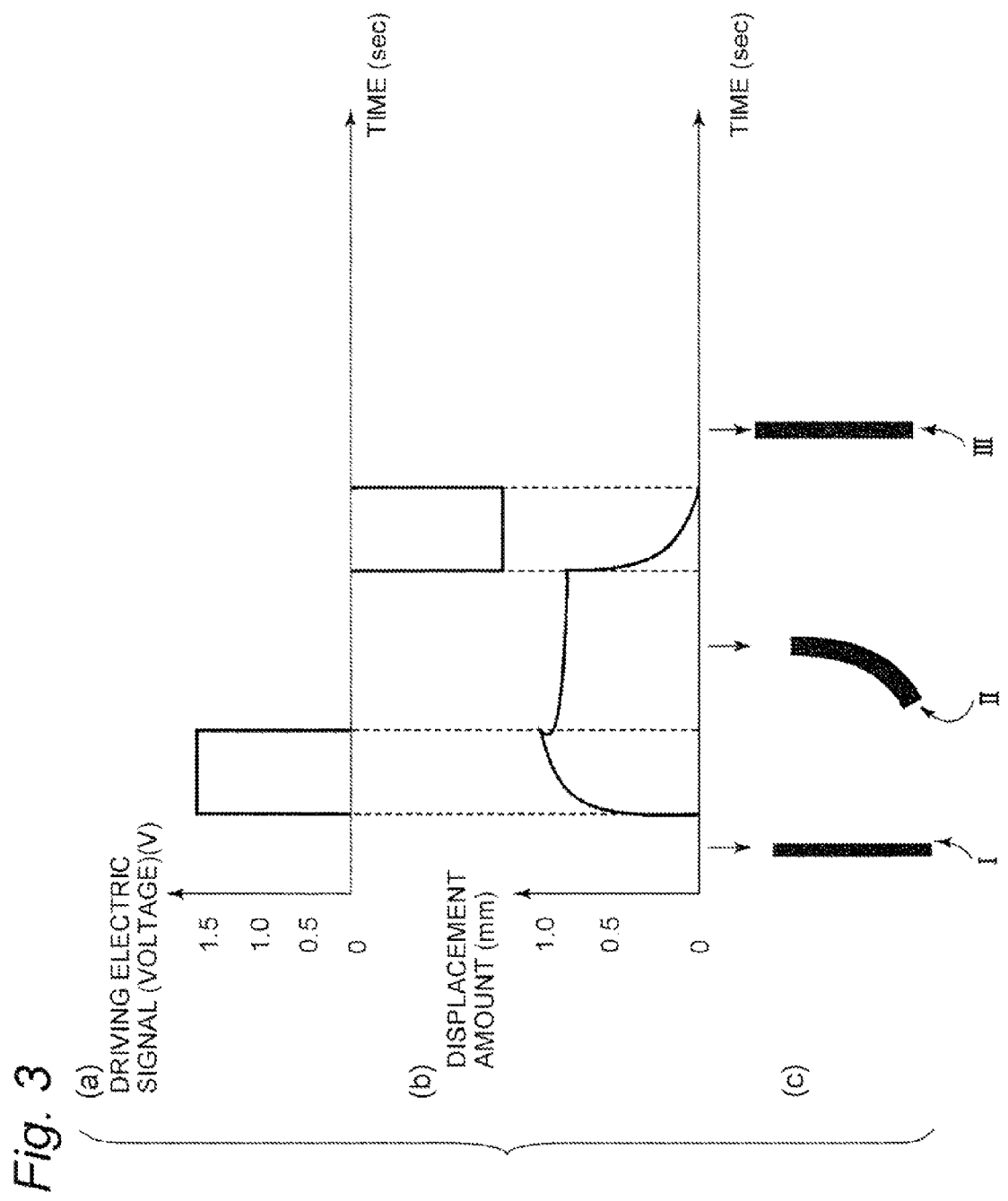
FIG. 3 is a view that shows an operation characteristic of the conductive polymer actuator device according to the first embodiment.

FIG. 3 shows operation characteristics of a conductive polymer actuator having the structure of FIG. 1.

FIG. 3 shows a signal pattern (see (a) of FIG. 3) obtained upon application of a voltage for a fixed period of time as a driving electric signal between the control electrode 103 and the opposed electrode unit 104 and the result of measurements (see (b) of FIG. 3) of a displacement amount of a tip end of the actuator operation unit 90, obtained by a laser displacement gauge. Moreover, (c) of FIG. 3 schematically shows an outer shape I of the actuator operation unit 90 prior to the application of a positive voltage, an outer shape II of the actuator operation unit 90 immediately after the stoppage of the application of the positive voltage, prior to an application of a negative voltage, and an outer shape III of the actuator operation unit 90 after the stoppage of the application of the negative voltage.

In general, in the conductive polymer actuator, as shown in (b) of FIG. 3 and II of (c) of FIG. 3, a characteristic (memory characteristic) for maintaining a displacement amount even after the driving voltage has been turned off is provided. However, since the displacement is gradually changed with time, it is found that the displacement amount cannot be controlled appropriately only by adjusting the driving voltage. For example, in the case where repetitive expansion/contraction operations are carried out by applying a cyclic driving voltage, since the amplitude and the center of oscillation are changed with time, it is not possible to accurately control the amplitude and the center of oscillation of the expansion/contraction operations only by adjusting the driving voltage to be applied. Moreover, in the case where, after having been left for a long time, with the driving voltage turned off, the application of the driving voltage is resumed, since an operation is resumed from a position that is greatly different from the position prior to the turning-off of the driving voltage, it is also difficult to control the displacement only by adjusting the driving voltage to be applied.

In this case, disconnecting a wire of a circuit constituted by a power supply and the actuator operation unit 90 at any point is defined to be represented by "voltage is turned off", or "voltage is shut off", or "voltage is released".

FIG. 21A is a view that schematically shows a structural example of a conductive polymer actuator according to one embodiment of the present invention. As shown in FIG. 21A, the actuator operation unit 90, constituted by a conductive polymer film portion 101, an electrolyte portion 102, a control electrode 103, and an opposed electrode unit 104, is connected to a variable power supply 93A through a switch 93B. By changing the power supply voltage of the variable power supply 93A in this state, the actuator can be operated. In a state shown in FIG. 21B, a switch 93B located between the variable power supply 93A and the actuator operation unit 90 is opened. As described above, this state is represented by "voltage is turned off", or "voltage is shut off", or "voltage is released".

Moreover, FIG. 22A is a view that schematically shows a structural example of another conductive polymer actuator according to the embodiment of the present invention. As shown in FIG. 22A, the actuator operation unit 90 is connected to the variable power supply 93A through the switch 93B, and the control electrode 103 and the opposed electrode unit 104 are connected with each other through a wire having a switch 93C. In a state shown in FIG. 22A, the switch 93B between the actuator operation unit 90 and the variable power supply 93A is in a closed state, with the switch 93C between the control electrode 103 and the opposed electrode unit 104 being in an opened state, and by changing the power supply voltage of the variable power supply 93A in this state, the actuator can be operated. In a state shown in FIG. 22B, the switch 93B located between the variable power supply 93A, and the actuator operation unit 90 is opened, and the switch 93C between the control electrode 103 and the opposed electrode unit 104 is in a closed state, and as described earlier, this state is also considered to be one example of the state represented by "voltage is turned off", or "voltage is shut off", or "voltage is released".

Additionally, in the case where, after the actuator has been operated in the state of FIG. 21A, it is brought into a state as shown in FIG. 21B, since the distribution of ions is maintained substantially in the same state for a while, the displacement is also maintained substantially in the same state; however, the displacement is gradually changed due to a small amount of leak current flowing through the actuator operation unit 90.

Moreover, in the case where, after the actuator has been operated in the state of FIG. 22A, it is brought into a state as shown in FIG. 22B, the distribution of ions is stabilized to a fixed distribution after a lapse of a long period of time since the change. Accordingly, the displacement of the actuator operation unit 90 is also stabilized to a fixed value of displacement with time, after a lapse of a long period of time since the change.

<Operation Characteristic of Conductive Polymer Actuator Newly Discovered>

The present inventor has newly discovered a relationship that is held between the current and the displacement, when a conductive polymer actuator is driven. By using this relationship, the present invention controls the displacement of the conductive polymer actuator.

Figure 4A:
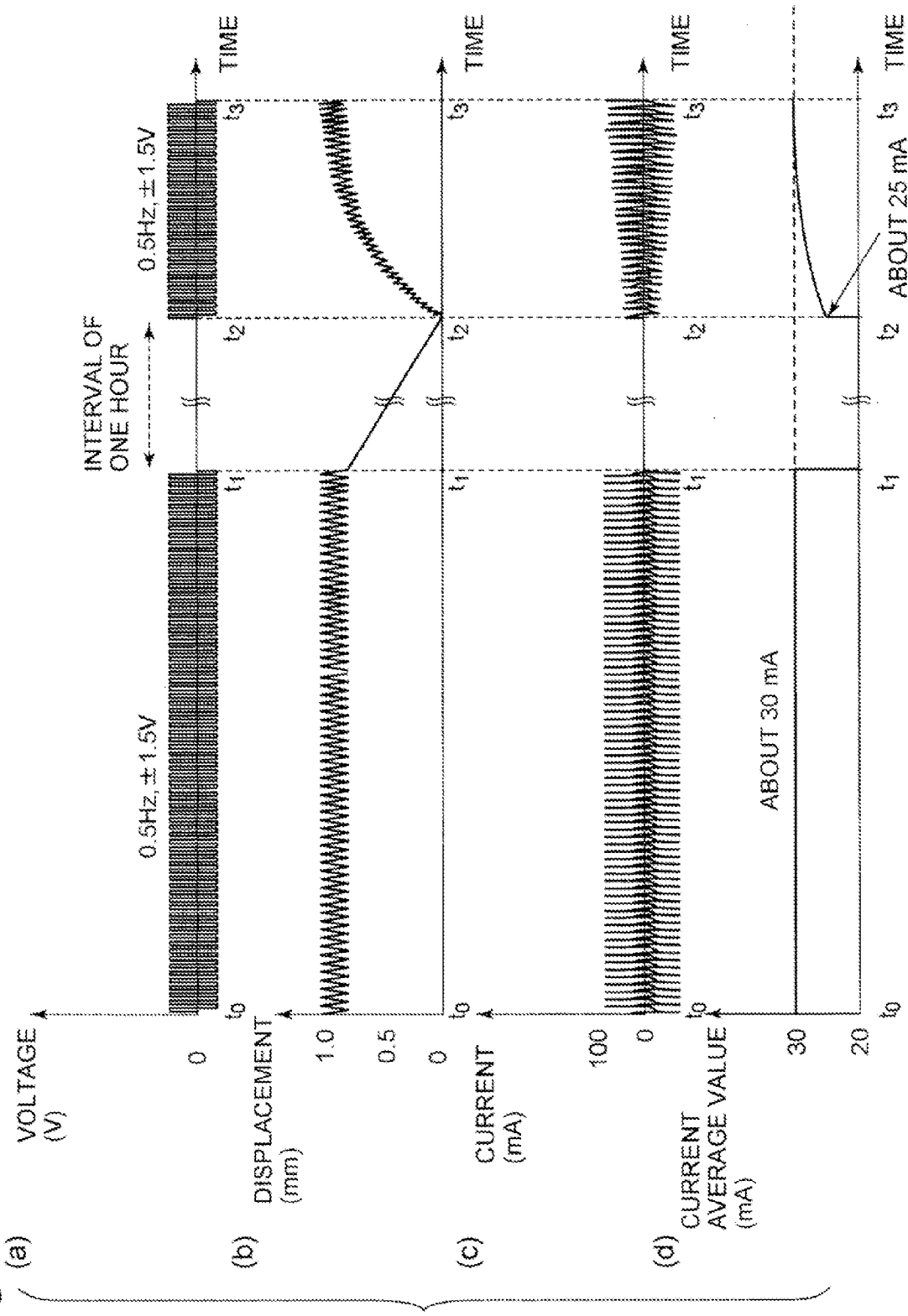
FIG. 4A is a view that schematically shows relationship between each of factors, such as a driving voltage, a displacement amount of the actuator, a current, and a current average value, and time in the conductive polymer actuator according to the first embodiment.

FIG. 4A is a schematic view that shows relationships among a voltage to be applied to the control electrode 103 (referred to as "driving voltage", with the voltage of the opposed electrode unit 104 serving as a reference), the displacement amount of the actuator operation unit 90, and a current flowing through the control electrode 103 in the conductive polymer actuator of FIG. 1. In this case, since the control electrode 103 and the conductive polymer film portion 101 are series-connected with each other relative to the power supply, as shown in FIG. 1, the current flowing through the control electrode 103 is equal to a current flowing through the conductive polymer film portion 101. In this case, the current flowing through the conductive polymer film portion 101 is defined as corresponding to the current passing through the conductive polymer film portion 101 when viewed from the outside. In this experiment, a voltage of ±1.5 V with a rectangular waveform is applied between the control electrode 103 and the opposed electrode 104 at a frequency of 0.5 Hz. Here, (d) of FIG. 4A shows a graph that is formed by calculating an average value of absolute values of current values for every certain fixed period of time, and by smoothly connecting the resulting values to one after another. As a method for finding the average value of absolute values of the current values, for example, a method is proposed in which an average value is found for every two seconds corresponding to a cyclic period of time of the driving voltage. In this case, at time $t_0$ of FIG. 4A, after the start of the voltage application, the actuator operation unit 90 has executed expansion/contraction operations more than 1000 times, and the expansion/contraction operations of the actuator operation unit 90 are stabilized sufficiently. In this state, the center of oscillation is located at a positive position. At this time, the average value of the absolute values of the current values flowing through the actuator was about 30 mA. Moreover, the current maximum value in one cycle of the driving voltage was about 100 mA. In this case, the current flowing through the actuator is defined as a current passing through the conductive polymer film portion 101 when viewed from the outside. The application of a voltage to the actuator was stopped at time $t_1$, and the application of a voltage to the actuator was resumed at time $t_2$. In this case, the application of a voltage to the actuator is defined as applying a voltage between the control electrode 103 and the opposed electrode 104. In the case where a voltage is applied between the control electrode and the opposed electrode, the voltage is indirectly applied between the conductive polymer film portion and the opposed electrode. For this reason, when put it in other words, the application of a voltage to the actuator is to apply a voltage between the conductive polymer film portion and the opposed electrode. Moreover, another structure containing no control electrode may be proposed as the actuator of the present invention, and in this case, the application of a voltage to the actuator is defined as applying a voltage between the conductive polymer film portion and the opposed electrode. Furthermore, still another structure containing a reference electrode may be proposed as the actuator of the present invention, and in this case, the application of a voltage to the actuator is defined as applying a voltage between the conductive polymer film portion and the reference electrode. Still another structure containing both of the reference electrode and the control electrode may be proposed as the actuator of the present invention, and in this case, the application of a voltage to the actuator is defined as applying a voltage between the control electrode and the reference electrode. In this case, however, when a voltage is applied between the control electrode and the reference electrode, the voltage is indirectly applied between the conductive polymer film portion and the reference electrode. For this reason, in the case of including both of the reference electrode and the control electrode, when put it in other words, the application of a voltage to the actuator is to apply a voltage between the conductive polymer film portion and the reference electrode. In an example of FIG. 4A, a period of time between time $t_1$ and time $t_2$ corresponds to one hour. From FIG. 4A, it is found that, when the application of the voltage to the actuator is resumed, the actuator operation unit 90 is displaced in the negative direction, in comparison with the state in which the application of the voltage to the actuator is stopped. Moreover, after the resumption of the voltage application to the actuator, the amplitude of the actuator operation unit 90 was reduced in comparison with that before the stoppage of the voltage application, and the average value of the absolute values of the current values was also reduced to about 25 mA. Furthermore, the current maximum value in one cycle of the driving voltage was about 80 mA. Thereafter, the amplitude becomes gradually greater, and the center position of oscillation is gradually moved in the positive direction. At this time, the current flowing through the actuator becomes greater together with an increase of the amplitude so that, at time $t_3$, the average value of the absolute values of the current was recovered to about 30 mA. Moreover, the current maximum value in one cycle of the driving voltage at time $t_3$ was about 100 mA. FIG. 4B shows how to change the center position of expansion/contraction together with time, when the actuator operation unit 90 carries cut expansion/contraction operations. Moreover, FIG. 5 is a view that schematically shows an approximate relationship between the center position of expansion/contraction of the actuator operation unit 90 and an average value of the currents, found based on the relationship shown in (d) of FIG. 4A and FIG. 4B.

Figure 5:
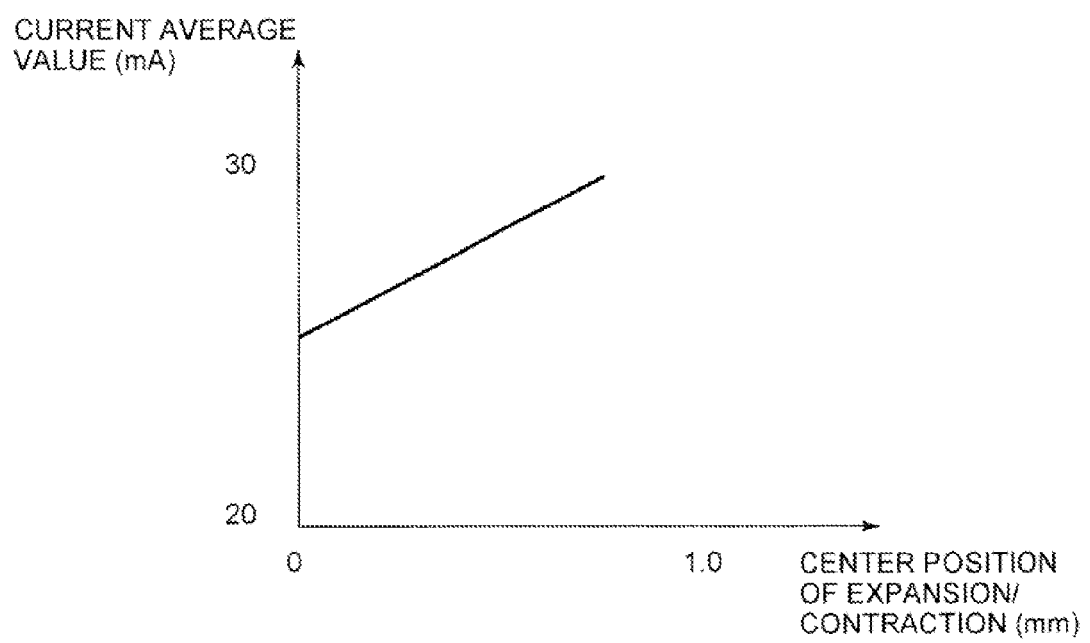
FIG. 5 is a view that schematically shows an approximate relationship between the center position of expansion/contraction and a current average value, upon expansion/contraction of the conductive polymer actuator.

It was newly found by the present experiment that, as shown in FIG. 5, when the actuator operation unit 90 carries out expansion/contraction operations, there is a one-to-one corresponding relationship between the center position of expansion/contraction and the current average value. That is, in the example of the conductive polymer actuator of the first embodiment, when the actuator operation unit 90 carries out expansion/contraction operations, the amplitude of the expansion/contraction operations of the actuator operation unit 90 becomes greater, in the case where the center position of oscillation is moved in a positive direction, and at this time, the current flowing through the actuator also becomes greater in this relationship.

Based on the above-mentioned relationship, by measuring the current value flowing through the actuator upon application of a voltage signal having a fixed waveform, typically represented by, for example, a rectangular waveform, to the actuator, the displacement of the actuator operation unit 90 (an absolute displacement amount from a fixed point of the actuator operation unit 90) can be detected. Moreover, it is found that, by feeding back the displacement of the actuator detected by this method, the displacement of the conductive polymer actuator can be accurately controlled. In some of the above descriptions, the displacement of the actuator operation unit 90 is expressed simply as the displacement of the actuator.

In the above description, with respect to the displacement of the actuator operation unit, the positive direction is defined as a direction in which the conductive polymer film portion 101 is expanded.

<Consideration Concerning Relationships Among Displacement, Amplitude, and Current Value in Conductive Polymer Actuator>

Figure 6A:
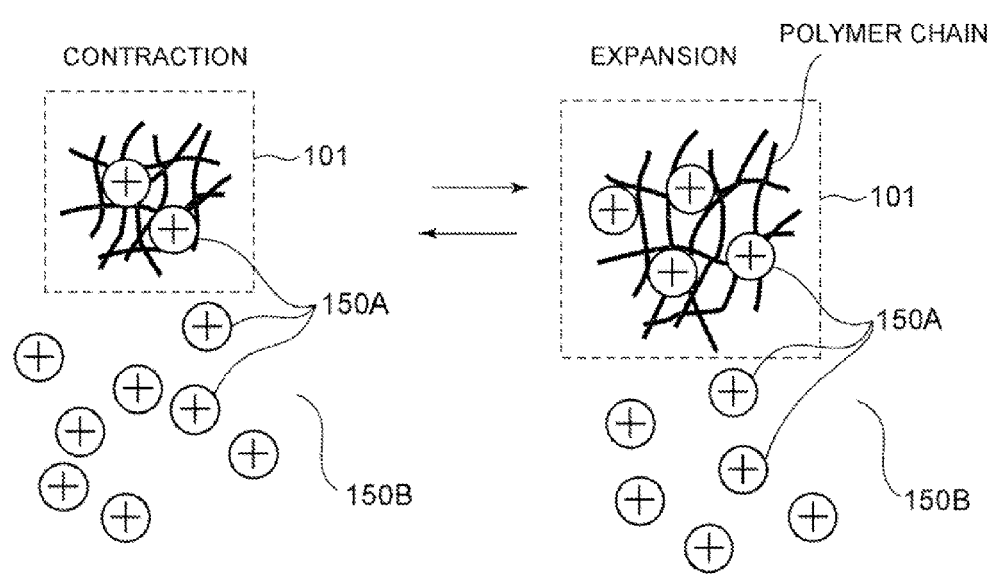
FIG. 6A is a view that shows an operation example in the case where, upon repeating expansion/contraction operations, the conductive polymer actuator is gradually displaced in its expansion direction.
Figure 6B:
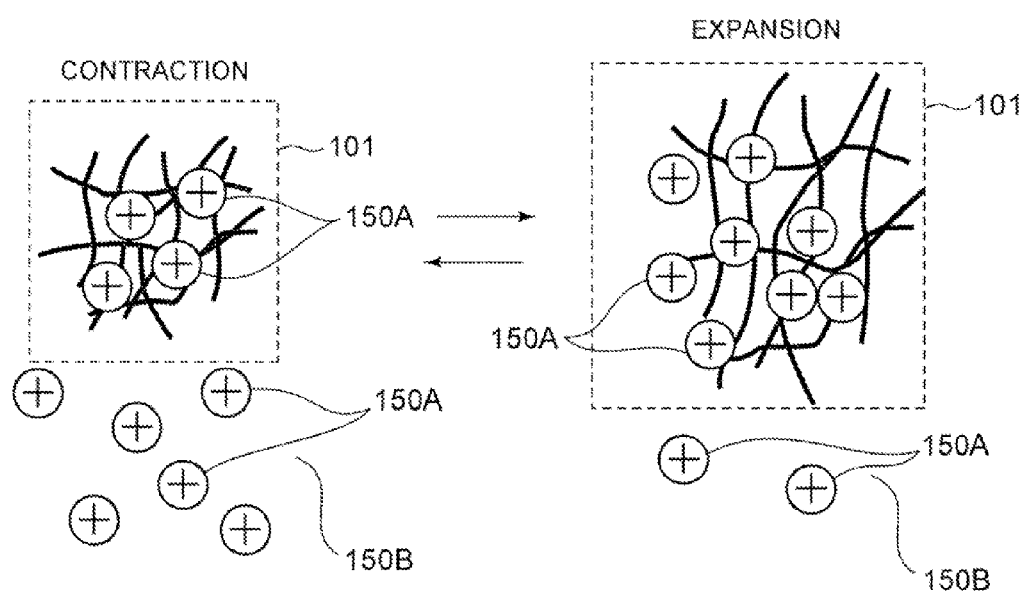
FIG. 6B is a view that shows another operation example in the case where, upon repeating expansion/contraction operations, the conductive polymer actuator is gradually displaced in its expansion direction.

Referring to the drawings, the following description will examine the reason why the above-mentioned relationships are held among the displacement, the size of the amplitude, and the current value. FIGS. 6A and 6B show operation examples in which, upon allowing the conductive polymer film portion to repeat expansion/contraction operations in a general-use conductive polymer actuator, the conductive polymer film portion of the conductive polymer actuator is gradually displaced in its expanding direction.

In the conductive polymer actuator, it is considered that, in general, expansion/contraction operations are executed by incoming and outgoing ions 150A from an electrolyte solution 150B (corresponding to the electrolyte portion 102 in FIG. 1) to the conductive polymer film portion 101. In the initial state, as shown in FIG. 6A, the number of ions 150A that are present inside the conductive polymer film portion 101 in the contracted state of the conductive polymer film portion 101 is comparatively small; however, as the conductive polymer actuator repeats expansions/contractions for a long period of time, the ions 150A are gradually left inside the conductive polymer film portion 101 to remain therein so that it is considered that, as shown in FIG. 6B, the number of the ions 150A that are present inside the conductive polymer film portion 101 becomes comparatively greater in the contracted state of the conductive polymer film portion 101. As a result, in the case where the conductive polymer actuator repeats expansions/contractions for a long period of time, a phenomenon is generated in which the conductive polymer film portion 101 is gradually expanded. Moreover, in a state shown in FIG. 6B corresponding to an expanded state of the conductive polymer film portion 101 in comparison with the state shown in FIG. 6A, it is considered that since gaps of a network structure of polymer chains forming the conductive polymer film portion 101 become greater, outgoing and incoming ions 150A are easily generated. As a result, when the conductive polymer actuator repeats expansions/contractions for a long period of time, the amounts of incoming and outgoing ions 150A become greater, with the result that the amplitude of the expansion/contraction operations of the conductive polymer film 101 and the current value subsequently become greater.

Additionally, the descriptions of FIGS. 6A and 6B have been given by exemplifying the cation-driving-type conductive polymer actuator in which expansion/contraction operations are executed by utilizing incoming and outgoing movements of the cations (positive ions) 150A, and the same considerations can also be held on the anion-driving-type conductive polymer actuator. Moreover, in the descriptions of FIGS. 6A and 6B, it is supposed that the expansion/contraction operations are started in the initial state that is defined as a state where the device has been left for a long time, with expansion/contraction operations being stopped, after the power supply 93 is opened.

In FIGS. 6A and 6B, a description is given by exemplifying a case in which, when expansion/contraction operations are repeated, the ions 150A are left inside the conductive polymer film portion 101 to gradually cause an expansion; however, when the method for applying a driving voltage is changed, or when another material is used, it may have another case in which, when expansion/contraction operations of the actuator are repeated, the conductive polymer film portion 101 is gradually contracted. For example, supposing that a positive voltage with a rectangular waveform, as shown in FIG. 7 as an example of the driving voltage waveform, is applied to the actuator for a long time, the conductive polymer film portion 101 is gradually contracted when the expansion/contraction operations are repeated. In this case, it is considered that, since the positive voltage is applied to the conductive polymer film portion 101 for a long period of time, a large amount of cations go out from the conductive polymer film portion 101 so that the amount of contraction of the conductive polymer film portion 101 becomes greater, and since the negative voltage is applied to the conductive polymer film portion 101 only for a short period of time, only a small amount of cations come into the conductive polymer film portion 101 so that the amount of expansion of the conductive polymer film portion 101 becomes smaller. As a result, it is considered that, when the expansion/contraction operations of the conductive polymer film portion 101 are repeated, the conductive polymer film portion 101 is gradually contracted. In this case, the cation-driving-type conductive polymer actuator is exemplified.

Figure 8A:
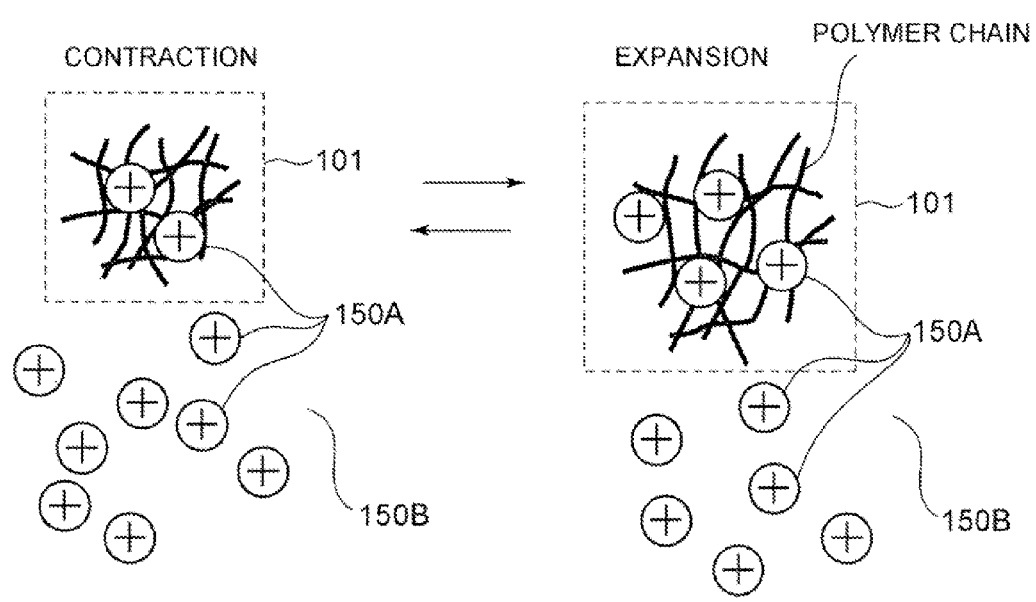
FIG. 8A is a view that shows an operation example in the case where, upon repeating expansion/contraction operations, the conductive polymer actuator is gradually displaced in its contraction direction.
Figure 8B:
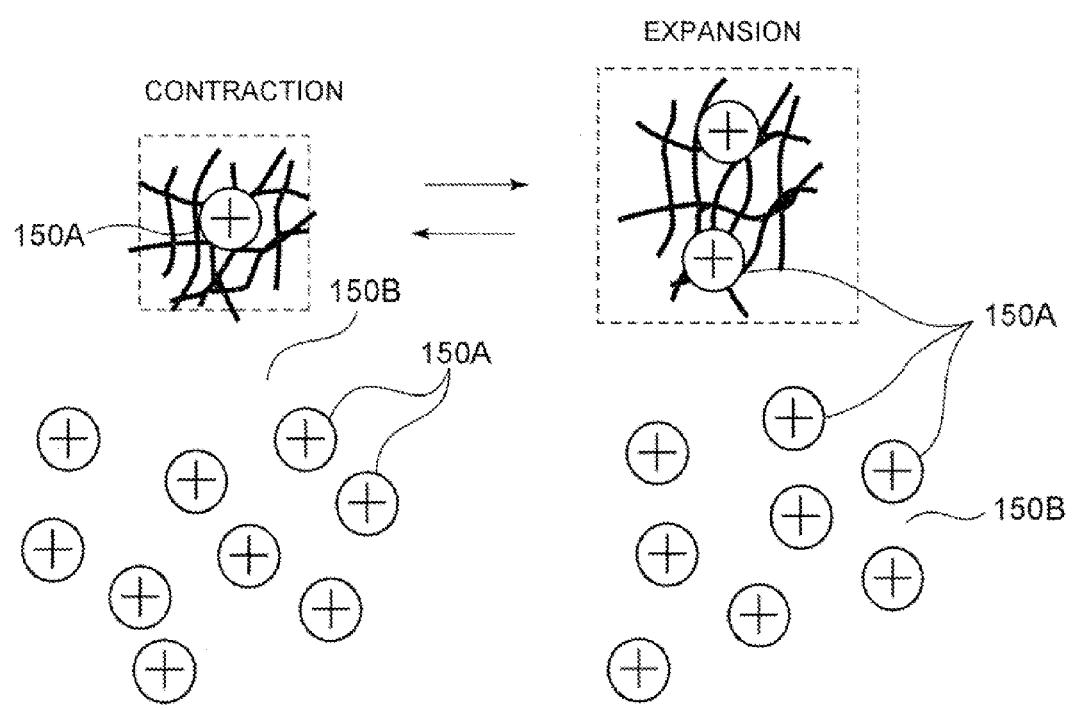
FIG. 8B is a view that shows another operation example in the case where, upon repeating expansion/contraction operations, the conductive polymer actuator is gradually displaced in its contraction direction.

FIGS. 8A and 8B are views each of which shows an operation example in the case where, upon repeating expansion/ contraction operations of the conductive polymer actuator, the conductive polymer film portion 101 is gradually displaced in its contraction direction. In the initial state, expansion/contraction operations are carried cut in the state of FIG. 8A; however, when the expansion/contraction operations are continued for a long period of time, ions 150A have gone out of the conductive polymer film portion 101 so that it is considered that, in a contracted state and an expanded state shown in FIG. 8B, the number of ions 150A inside the conductive polymer film portion 101 becomes smaller than that of FIG. 8A. As a result, the conductive polymer film portion 101 is contacted. In this state, a network structure of polymer chains forming the conductive polymer film portion 101 has its gaps narrowed so that it is considered that outgoing and incoming ions 150A are hardly generated. As a result, after the expansion/contraction operations have been repeated for a long period of time, the quantities of incoming and outgoing ions 150A become smaller so that it is presumed that accordingly, the amplitude of the expansion/contraction operations and the current value of the conductive polymer film portion 101 become smaller.

In any of the cases of FIGS. 6A and 6B as well as FIGS. 8A and 8B, in the case where, upon expansion/contraction operations of the conductive polymer actuator, the position of the center of oscillation is located at a position deviated in an expansion direction from the reference state, a relationship is presumably held in which the amplitude of the expansion/contraction operations becomes greater than that in the reference state and the current flowing through the actuator at this time subsequently becomes greater than the reference state. In contrast, in any of the cases of FIGS. 6A and 6B as well as FIGS. 8A and 8B, in the case where, upon expansion/contraction operations of the conductive polymer actuator, the position of the center of oscillation is located at a position deviated in a contraction direction from the reference state, a relationship is presumably held in which the amplitude of the expansion/contraction operations becomes smaller than that in the reference state and the current flowing through the actuator at this time subsequently becomes smaller than the reference state.

The above descriptions have been given by exemplifying a case where a cyclic waveform is applied as a driving voltage waveform; however, the same relationship is considered to be held even in a case where the waveform is not a cyclic waveform. That is, in the case where the position of the actuator is located at a position deviated in the expansion direction from the reference state, upon application of a voltage having a certain waveform to the actuator, a relationship is presumably held in which the size of the operation becomes greater than that in the reference state, and the current flowing through the actuator at this time becomes greater than that of the reference state.

<Control Method for Actuator of the First Embodiment of the Present Invention>

Based on the above-mentioned examinations, it becomes possible to detect a displacement (the absolute displacement amount from a fixed point of the actuator) of the actuator by measuring a current value that flows upon application of a voltage signal having a constant waveform typically represented by a rectangular waveform or the like. By feeding back the displacement of the actuator detected by this method, the displacement of a conductive polymer actuator can be accurately controlled. Moreover, in comparison with the method of Patent Document 1, this method is advantageous in that the structure of the actuator becomes simpler.

In this case, the voltage to be applied to the actuator so as to detect the position (displacement) of the actuator is not necessarily required to have a cyclic waveform, and may be prepared as a waveform having an optional shape. As the current value to be measured, the maximum value of the current value, or the average value of the current values calculated by the aforementioned method, or the integration value of the absolute value of the current value that can be calculated by using the same method may be proposed.

In the descriptions, in the conductive polymer actuator as shown, for example, in FIG. 1, when the actuator operation unit 90 carries out a curving operation by an expansion or contraction operation of the conductive polymer film, this motion is defined to be simply represented as "the actuator is expanded or contracted". Moreover, when the actuator operation unit 90 carries out curving operations in the expansion/contraction directions by expansion/contraction operations of the conductive polymer film, these motions are defined to be simply represented as "the actuator is expanded and contracted". Moreover, with respect to displacements of the actuator operation unit 90, the displacement in an extending direction of the conductive polymer film is defined as "plus". Moreover, in some of the descriptions, the displacement of the actuator operation unit 90 is defined to be simply represented as "displacement of the actuator".

<Specific Example of Control Method for Actuator of the First Embodiment of the Present Invention>

Figure 9A:
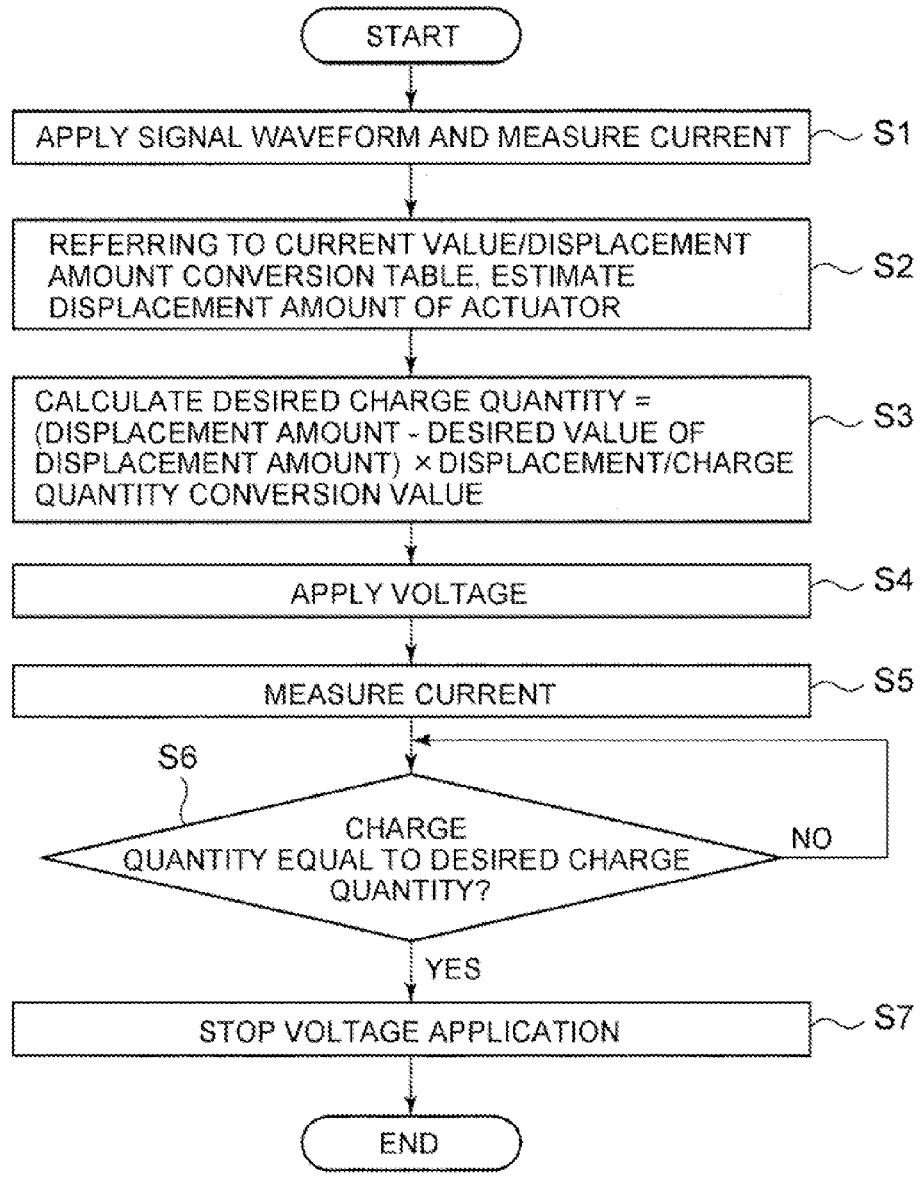
FIG. 9A is a flow chart that shows an example of a control method for the conductive polymer actuator according to the first embodiment of the present invention.

FIG. 9A is a flow chart that shows an example of a control method for the actuator according to the first embodiment of the present invention.

Figure 9B:
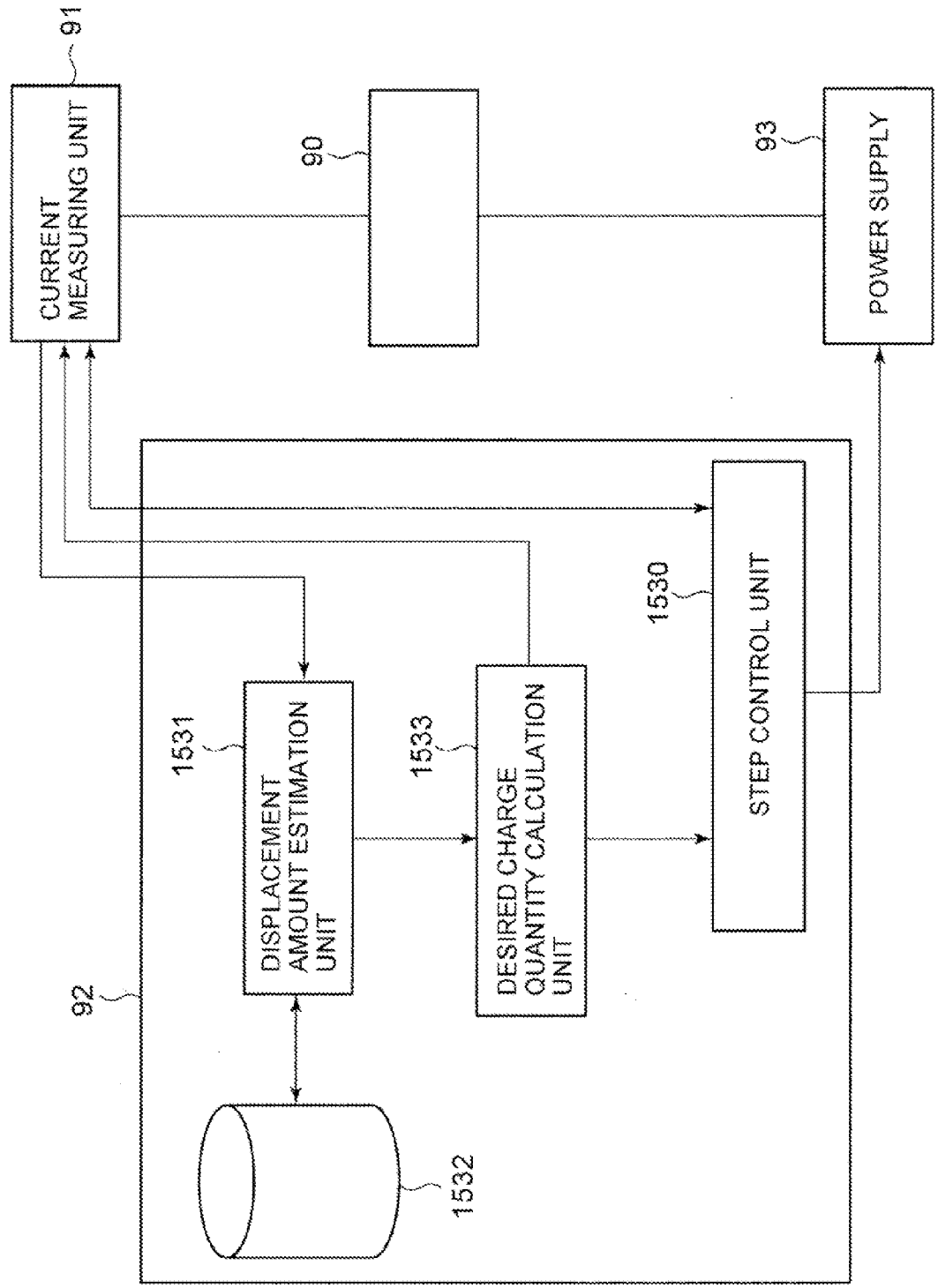
FIG. 9B is a view that shows a specific structure of a control unit of the conductive polymer actuator according to the first embodiment of the present invention.

FIG. 9B is a view that shows a specific structure of the control unit 92.

The control unit 92 is provided with a step control unit 1530, a displacement amount estimation unit 1531, a current value/displacement amount conversion table 1532, and a desired charge quantity calculation unit 1533.

In this case, a control device, which is capable of carrying out the method for controlling the actuator according to the first embodiment, is provided with: a displacement amount acquiring unit which, upon application of a voltage to the conductive polymer film portion 101 of the conductive polymer actuator through the electrode 104, acquires a current value flowing through the conductive polymer film portion 101, and obtains a displacement amount of the conductive polymer actuator based on the acquired current value, and a displacement amount adjusting unit which finds a difference between the displacement amount of the conductive polymer actuator acquired by the displacement amount acquiring unit and the desired value for the displacement amount, and applies a voltage to the conductive polymer film portion 101 based on the difference so that the displacement amount of the conductive polymer actuator can be adjusted. More specifically, for example, the displacement amount adjusting unit is constituted by a current measuring unit 91 serving as one example of a current detection unit, a displacement estimation unit 1531, and a current value/displacement amount conversion table 1532. The displacement amount estimation unit 1531 and the current value/displacement amount conversion table 1532 form one example of a displacement amount calculation unit. More specifically, for example, the displacement amount adjusting unit is constituted by a desired charge quantity calculation unit 1533, a step control unit 1530, and the current measuring unit 91.

The step control unit 1530 transmits a first step starting signal to the variable power supply 93 and the current measuring unit 91 at a predetermined timing.

When the power supply 93, which is, for example, a variable power supply, receives the first step starting signal from the step control unit 1530, it applies a predetermined driving voltage to the control electrode 103 of the actuator. The predetermined timing at which the first step starting signal is transmitted corresponds to the timing at which the following first step S1 is started, and also corresponds to, for example, the timing at which, from the off-state of the power supply 93, the operation is again started.

The current measuring unit 91 measures a current flowing through the actuator. That is, upon receipt of the first step starting signal from the step control unit 1530, the current measuring unit 91 measures the current flowing through the actuator, and transmits the results of current measurements to the displacement amount estimation unit 1531 placed inside the control unit 92.

In the current value/displacement amount conversion table 1517, a displacement amount/charge quantity conversion value that determines a relationship between the current value measured by the current measuring unit 91 and the displacement amount of the actuator is preliminarily stored.

The displacement amount estimation unit 1531 refers to the displacement amount/charge quantity conversion value of the current value/displacement amount conversion table 1517 so that the displacement amount is estimated from the current value measured by the current measuring unit 91. That is, upon receipt of the results of current measurements from the current measuring unit 91, the displacement amount estimation unit 1531 refers to the current value/displacement amount conversion table 1517, and estimates the displacement amount from the measured current, and outputs the resulting value to the desired charge quantity calculation unit 1533 as an estimated displacement amount.

Upon receipt of the estimated displacement amount from the displacement amount estimation unit 1531, the desired charge quantity calculation unit 1533 calculates the desired charge quantity based on the following equation 1.

Desired charge quantity=(Estimated displacement amount−Desired value of displacement amount)× Displacement/charge quantity conversion value  (Equation 1)

In this case, the displacement amount/charge quantity conversion value is a predetermined value, and the desired charge quantity calculation unit 1533 keeps this value. The desired charge quantity calculation unit 1533 calculates the desired charge quantity, and outputs the resulting value to the current measuring unit 91 and the step control unit 1530.

Upon receipt of the desired charge quantity from the desired charge quantity calculation unit 1533, the step control unit 1530 outputs a fourth step starting signal to the power supply 93.

Upon receipt of the fourth step starting signal, the power supply 93 starts applying a predetermined voltage to the actuator.

On the other hand, upon receipt of the desired charge quantity from the desired charge quantity calculation unit 1533, the current measuring unit 91 starts measuring the current value. Moreover, the current measuring unit 91 integrates the current value, and when the integrated value becomes equal to the desired charge quantity, it outputs a fourth step completion signal to the step control unit 1530. Upon receipt of the fourth step completion signal from the current measuring unit 91, the step control unit 1530 outputs the fourth step completion signal to the power supply 93. Upon receipt of the fourth step completion signal from the step control unit 1530, the power supply 93 completes the application of a voltage to the actuator.

FIG. 10 shows an example of time-based changes among a voltage to be applied to the control electrode 103 of the actuator, the displacement amount of the actuator, and a current flowing between the control electrode 103 and the opposed electrode 104, when the control method of FIG. 9A is used.

In this example, the following description will discuss the case where the displacement amount of the actuator is adjusted to a predetermined desired value. In this case, the first step S1 to the third step S3 correspond to displacement amount estimation steps, and the fourth step S4 to the seventh step S7 correspond to displacement amount adjusting steps.

Figure 11:
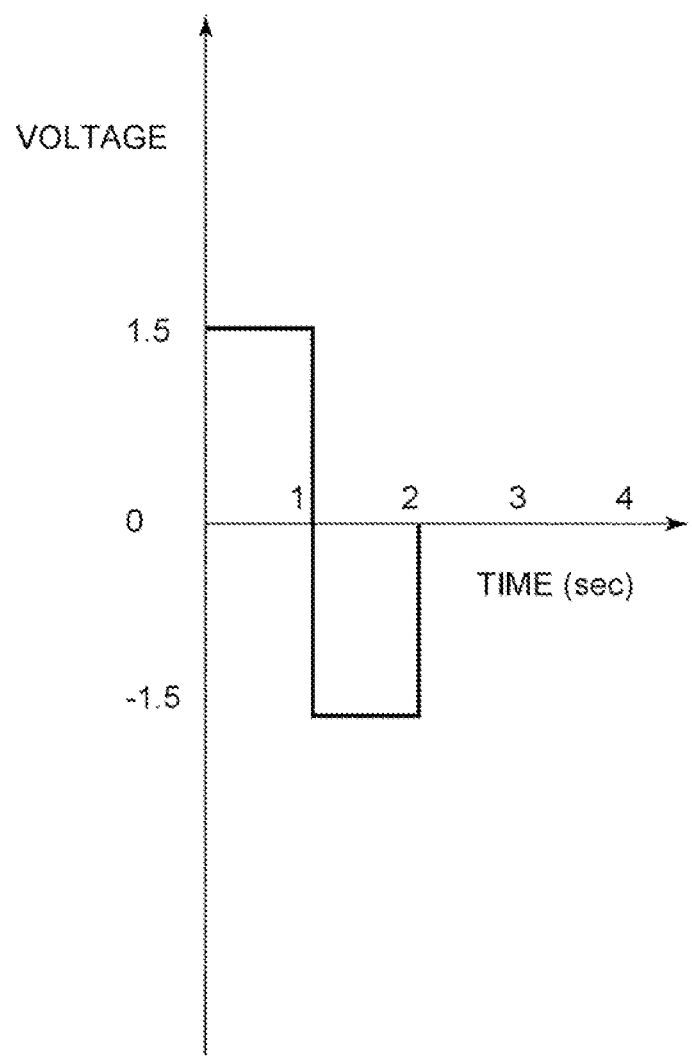
FIG. 11 is a view that shows an example of a relationship between a voltage having a signal waveform to be applied to a control electrode and time in the first embodiment of the present invention.

First, as the first step S1, the step control unit 1530 transmits a first step starting signal to the variable power supply 93 and a current measuring unit 1521 at a predetermined timing. Moreover, upon receipt of the first step starting signal from the step control unit 1530, the power supply 93 applies a voltage having a certain signal waveform to the control electrode 103. As the example of the signal waveform to be applied to the control electrode 103, as shown in FIG. 11, a rectangular-shaped waveform having one cycle with a frequency of 0.5 Hz, an amplitude of 1.5 V, and the center of oscillation of 0 v is proposed. Moreover, upon receipt of the first step starting signal from the step control unit 1530 in the first step S1, the current measuring unit 91 measures a current flowing between the control electrode 103 and the opposed electrode 104. As the method for measuring the current by the current measuring unit 91, for example, a method for measuring the current maximum value by the current measuring unit 91 is proposed. Another method may be proposed in which the average value of the absolute values of the current values is measured by the current measuring unit 91. Still another method may be proposed in which a value obtained by integrating the absolute value of the current value is measured by the current measuring unit 91. The current measuring unit 91 transmits the measured result of the current to the displacement amount estimation unit 1531 placed inside the control unit 92.

Next, in second step S2, by referring to the displacement amount/charge quantity conversion value, preliminarily stored in the current value/displacement amount conversion table 1532, the measured current value is converted to a displacement amount, and the displacement amount of the actuator at this state is estimated by the displacement amount estimation unit 1531 of the control unit 92. In this case, the displacement amount/charge quantity conversion value preliminarily stored in the current value/displacement amount conversion table 1532 is used for determining the relationship between the current value measured in first step S1 and the displacement amount of the actuator. Upon forming the displacement amount/charge quantity conversion value preliminarily stored in the current value/displacement amount conversion table 1532, for example, experiments, as described by using FIG. 5, are carried out, and the relationship between the center position of expansion/contraction of the actuator and the current average value is stored by the current value/displacement amount conversion table 1532 as the relationship between the displacement amount and the current value in this case, in some of descriptions, the expansion/contraction of the actuator operation unit 90 is simply represented as the expansion/contraction of the actuator.

Next, in third step S3, a difference between the displacement amount estimated by second step S2 and the desired value of the displacement amount, that is, {(displacement amount)−(desired value of displacement amount)}, is calculated in the desired charge quantity calculation unit 1533. Moreover, based on the difference in displacement amount calculated at this time, the desired charge quantity calculation unit 1533 calculates a desired charge quantity. This desired charge quantity is calculated, for example, by multiplying the calculated difference in displacement amount by a displacement/charge quantity conversion value that is predetermined constant value in the desired charge quantity calculation unit 1533.

As has been generally known, the charge quantity flowing through the conductive polymer actuator and the displacement change in the conductive polymer actuator are substantially proportional to each other {for example, see Non-Patent Document 1 (A. Della Santa et al., Performance and work capacity of a polypyrrole conducting polymer linear actuator, Synthetic Metals 90 (1997), pp. 93-100.)}. In the first embodiment of the present invention, this proportional constant is used as a displacement/charge quantity conversion value. A specific method for determining the displacement/charge quantity conversion value will be described later.

Next, in fourth step S4, upon receipt of the desired charge quantity by the step control unit 1530 from the desired charge quantity calculation unit 1533, the step control unit 1530 outputs a fourth step starting signal to a variable power supply 1507 serving as one example of the voltage applying unit, and upon receipt of the fourth step starting signal, the power supply 93 starts applying a predetermined voltage to the actuator. That is, under the control of the control unit 92, a predetermined voltage used for getting the displacement of the actuator closer to the desired value is applied from the power supply 93 to the actuator. In this case, in the present embodiment, the application of the voltage to the actuator is defined as indicating that a voltage is applied between the control electrode 103 and the opposed electrode 104. For example, when the difference in the displacement amount calculated in third step S3 is a positive value, the power supply 93 applies a voltage of −1.5 V to the control electrode 103 with the opposed electrode 104 serving as the reference. In contrast, when the difference in the displacement amount calculated in third step S3 is a negative value, the power supply 93 applies a voltage of 1.5 V to the control electrode 103.

Next, in fifth step S5, the size of the charge quantity that has flowed through the actuator since the application of the voltage to the control electrode 103 in fourth step S4 measured by the current measuring unit 91.

Next, in sixth step S6, the charge quantity is calculated by the current measuring unit 91 by integrating the current value measured by the current measuring unit 91 in fifth step S5, and the voltage application from the power supply 93 to the actuator is kept under the control of the control unit 92, until the current measuring unit 91 has determined that the calculated charge quantity is equal to the desired charge quantity. When the current measuring unit 91 has determined that the measured charge quantity is equal to the desired charge quantity, the voltage application from the power supply 93 to the actuator is stopped under the control of the control unit 92 in step S7. That is, the current measuring unit 91 integrates the measured current value, and when it has determined that the integrated value becomes equal to the desired charge quantity (sixth step S6), the current measuring unit 91 outputs a fourth step completion signal to the step control unit 1530. Upon receipt of the fourth step completion signal from the current measuring unit 91, the step control unit 1530 outputs the fourth step completion signal to the power supply 93. Upon receipt of the fourth step completion signal from the step control unit 1530, the power supply 93 completes the application of the voltage to the actuator (seventh step S7).

Additionally, in the above description, only the size of the charge quantity is measured; however, a charge quantity flowing in a certain direction is defined as "positive", and the measurements may be carried out based on the values with the symbol. For example, in the case where the value of a charge quantity measured when a positive charge is allowed to flow into the control electrode is defined as "positive", the displacement/charge quantity conversion value to be used in third step S3 corresponds to a negative value.

By carrying out steps of first step S1 to seventh step S7, the displacement of the actuator may be made closer to the desired value. In this case, the displacement of the actuator operation unit 90 is defined as simply expressing the displacement of the actuator.

Additionally, the above description has exemplified a case where a constant voltage is applied in fourth step S4; however, the voltage may be varied with time. Moreover, the measured charge quantity may be fed back so as to change the voltage.

FIG. 10 has exemplified an anion-driving-type conductive polymer actuator that exerts a displacement in a positive direction upon application of a positive voltage; however, the same method may also be applied to a cation-driving-type conductive polymer actuator that exerts a displacement in a negative direction upon application of a positive voltage. In this case, however, with respect to the cation-driving-type conductive polymer actuator, in the case where a value of charge quantity, measured when a positive charge is allowed to flow into the control electrode 103, is defined as "positive", the displacement/charge quantity conversion value to be used in third step S3 corresponds to a positive value.

FIG. 10 shows the case where the desired value of displacement is 1 mm. Moreover, since second step S2 and third step S3 are carried out in an extremely short period of time, these steps are omitted from FIG. 10. Furthermore, in the case where, after fourth step S4 to seventh step S7, the application of a voltage is suspended, the displacement tends to gradually deviate from the desired value; however, in FIG. 10, this phenomenon is ignored.

Additionally, in the above example, the current measuring unit 91 carries out current measurements (step S1 and S5), and also determines whether or not the measured charge quantity has become equal to the desired charge quantity (step S6); therefore, it has a structure having both of the functions of a displacement amount acquiring unit and a displacement amount adjusting unit.

<Variations of Control Method>

As have been described by using FIGS. 4A and 4B, in the case where, with the power supply 93 of FIG. 1 being turned off, an operation is again started, the displacement before the turning-off of the power supply 93 tends to be greatly different from a displacement obtained when the operation is again started, in the case where the off-period of time is long (for example, 1 minute or more). In contrast, even in the case where, with the power supply 93 of FIG. 1 being turned off, an operation is again started, by carrying out the method of first step S1 to seventh step S7, the displacement can be made closer to the desired value. Moreover, the period of time in which the power supply 93 is turned off is measured, and only when the period of time exceeds a certain fixed value (only when the continuous time of the voltage released state exceeds a fixed period of time), the method of first step S1 to seventh step S7 is carried out upon resuming the operation (upon carrying out the operation again at a predetermined timing thereafter) so that the displacement can be made closer to the desired value. In this case, the predetermined timing is the timing at which the first step S1 is started, and, for example, corresponds to the timing at which, from the off-state of the power supply 93, the operation is again started.

FIG. 24 is a block diagram showing processes to be carried out by the control method (drawn based on a structural example of FIG. 17, which will be described later). An open time measuring unit 1600 measures an off-period of time of the power supply 93 (or 1507), and based on the result, the step control unit 1530 determines a transfer of steps, and carries out the control process in the case where, only when the off-period of time of the power supply 93 (or 1507) exceeds a certain fixed value, the method of first step S1 to seventh step S7 is carried out upon resuming the operation, the fixed period of time may be optionally set. The shorter the fixed period of time is set, the finer control process can be obtained. For example, in the example shown in FIG. 19, the off-state of the power supply for about one hour causes a change of about 2 mm in the displacement. Supposing that the rate of change in the displacement during the turning off of the power supply is constant, a change of about 100 μm is generated in 3 minutes. For this reason, in an attempt to carry out displacement control with an error of about 100 μm or less, it is proposed that the fixed period of time is set to about 3 minutes.

Figure 12:
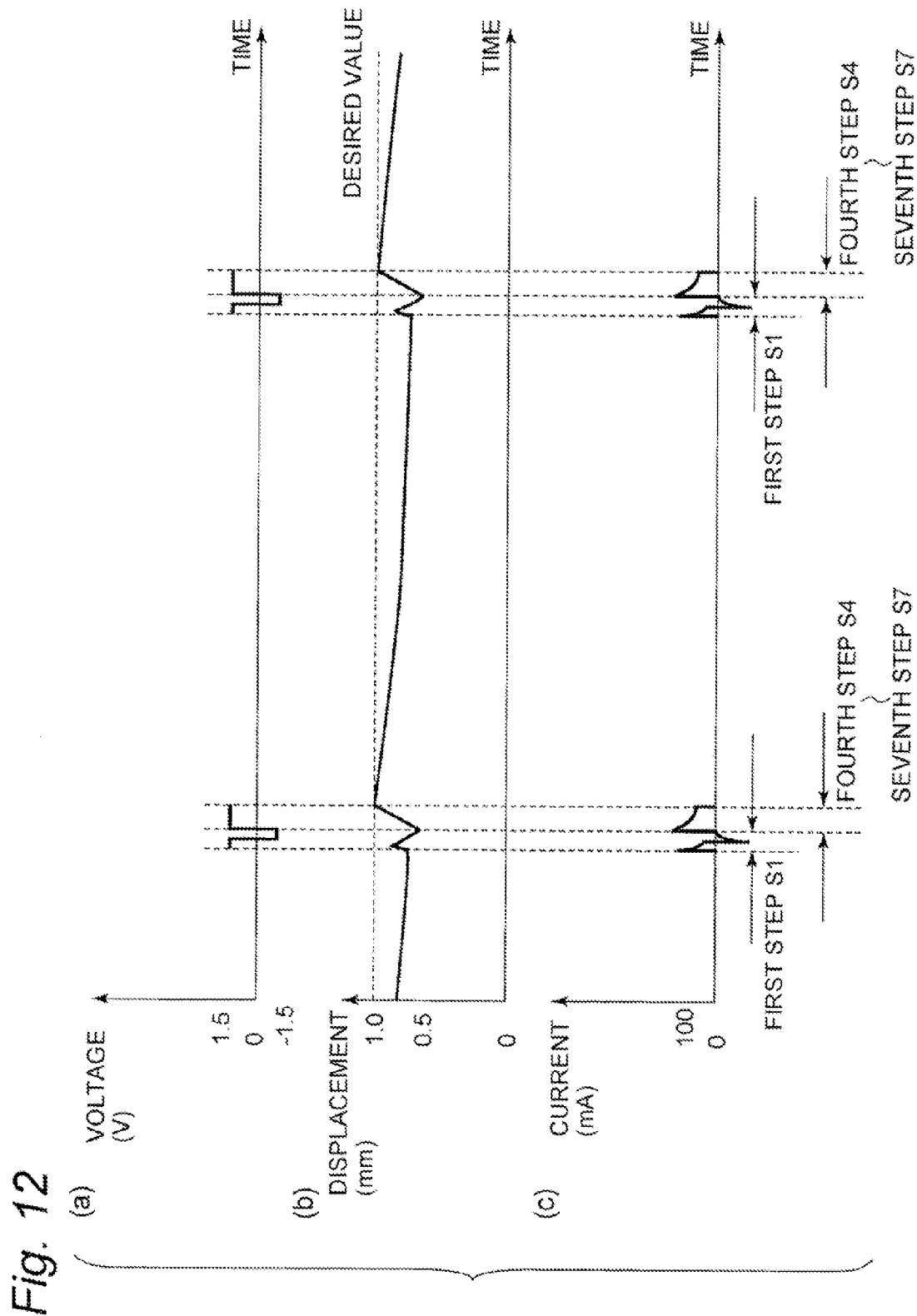
FIG. 12 is a view that shows an example of a method for carrying out steps from first step S1 to seventh step S7 for each fixed period of time so as to maintain the displacement of the actuator at a desired value in the first embodiment of the present invention.

Moreover, as shown in FIG. 12, in order to maintain the displacement of the actuator at the desired value, another method may be used in which the method of first step S1 to seventh step S7 is carried out for each fixed period of time. Since the execution time of second step S2 and third step S3 is extremely short, the illustration thereof is omitted from FIG. 12. Moreover, in periods of time other than the execution time of first step S1 to seventh step S7, an example is shown in which the power supply voltage is released. Moreover, in the periods of time other than the execution time of first step S1 to seventh step S7, the current value is omitted.

Furthermore, still another method may be proposed in which processes of first step S1 to third step S3 are carried out every fixed period of time, and only in the case where the size of a difference between the estimated displacement amount and the desired value becomes larger than a certain fixed value, processes of fourth step S4 to seventh step S7 are carried out.

Figure 13:
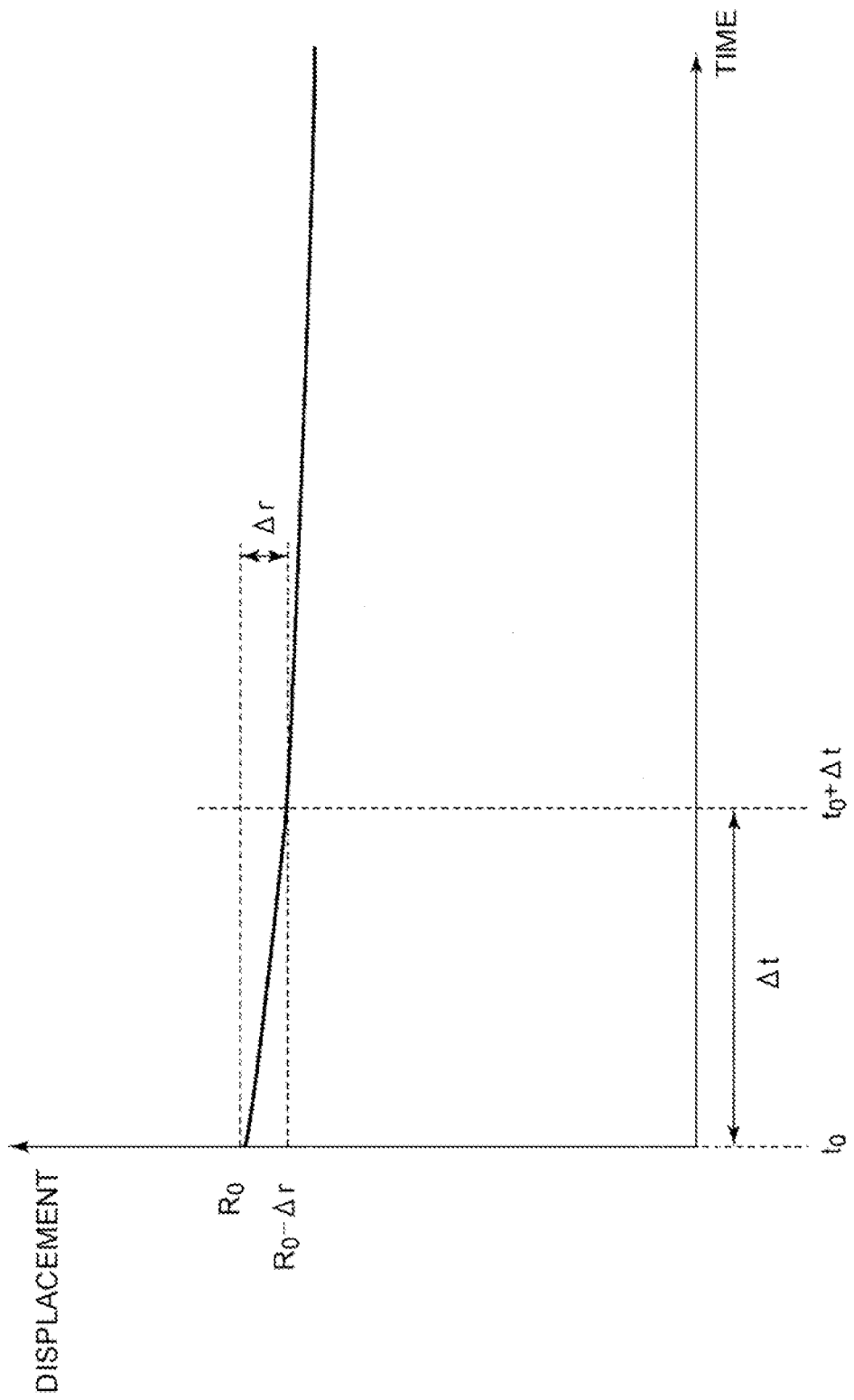
FIG. 13 is a view that shows a state of a time-based change of a displacement exerted upon releasing the voltage in the conductive polymer actuator.

In general, in the conductive polymer actuator, when the voltage is released, the displacement state can be maintained to a certain degree; however, after a lapse of a long period of time in the released state of the voltage, the displacement gradually changes. FIG. 13 is a view that shows this state in which the voltage is released at time $t_0$. At time $t_0$, the displacement is $R_0$, while the displacement is changed to $R_0 - \Delta r$ at time $t_0 + \Delta t$. Here, as an example of the method for carrying out displacement control on the actuator with an error precision of $\Delta r$ or less, a method is proposed in which, by carrying out the processes of first step S1 to seventh step S7 every time the period of time $\Delta t$ elapses in the released state of the voltage, the displacement of the actuator is adjusted. Moreover, another method may be proposed in which in the case where, with the power supply 93 of FIG. 1 being turned off, the operation of the actuator is again started, the step control unit 1530 is allowed to measure a period of time in which the power supply 93 is kept turned off, and when the step control unit 1530 has determined that the period of time is longer than $\Delta t$, the method of first step S1 to seventh step S7 is carried out so that the displacement of the actuator is made closer to the desired value.

<Characteristics of Control Method for Conductive Polymer Actuator of First Embodiment of the Present Invention>

By adopting the above-mentioned method, the displacement state (absolute displacement amount from a fixed point) of a conductive polymer actuator can be detected by using a simple structure, and it is possible to adjust the displacement state to the desired value by using the result.

As described earlier, the present inventor has newly found a relationship in which, in the case where the position (displacement) of a conductive polymer actuator is located at a position that deviates in an expansion direction from a reference state, the size of an operation obtained upon application of a voltage having a certain waveform becomes greater than the reference state, and the current to flow at this time is also made greater than the reference state. The method for controlling a conductive polymer actuator of the first embodiment of the present invention detects a displacement (absolute displacement amount from a fixed point) of the conductive polymer actuator by utilizing this relationship, and by feeding back this detected value, the displacement of the actuator is accurately controlled. By using this method, it becomes possible to accurately adjust the displacement of the actuator to the desired value by using a simple structure.

In particular, there is a relationship in which, in the case where, upon allowing the conductive polymer actuator to carry out expansion/contraction operations (oscillating operations), the center position of oscillation is located at a position that deviates in an expanding direction from a reference state, the amplitude of the expansion/contraction operations becomes greater than a reference state, and a current flowing at this time also becomes greater than a reference state. Therefore, as described above, by detecting the current value exerted upon allowing the conductive polymer actuator to carry out oscillation operations, it is possible to detect the displacement (absolute displacement amount from a fixed point) of the conductive polymer actuator.

The reason that the above-mentioned relationships hold among the center position of oscillation, the size of the amplitude of expansion/contraction operations, and the size of a current flowing thereto, is presumably because, as described with reference to FIGS. 6A, 6B, 8A, and 8B, in a state where the conductive polymer actuator is expanded, the network structure of the polymer chain forming the conductive polymer film has large gaps with the result that, since incoming and outgoing ions are easily generated, the amplitude of the expansion/contraction operations and the current value flowing thereto become greater. In this case, the state in which the conductive polymer film is expanded is defined as simply expressing that the conductive polymer actuator is expanded.

<Specific Method for Determining Displacement/Charge Quantity Conversion Value>

Upon determining the displacement/charge quantity conversion value, the following experiments are carried out.

Figure 14:
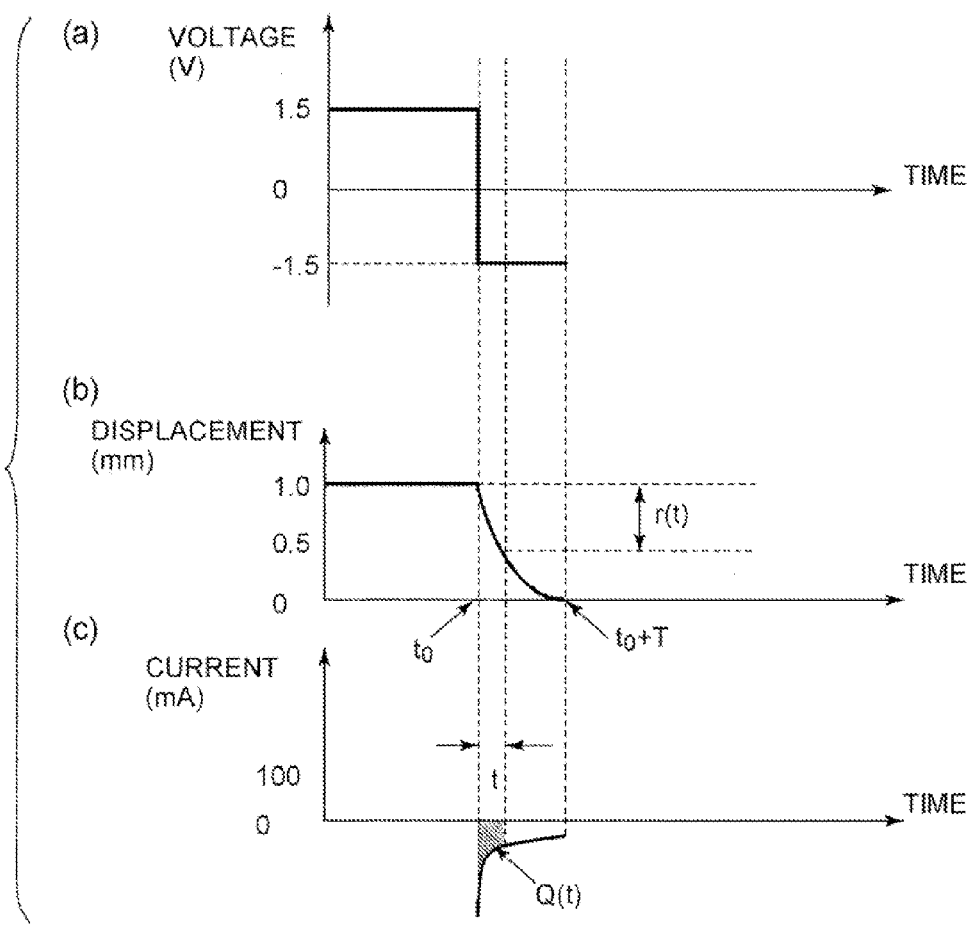
FIG. 14 is a view that schematically shows a relationship between each of the quantity of charge to flow, displacement of the actuator and the current, and time in the conductive polymer actuator.
Figure 15:
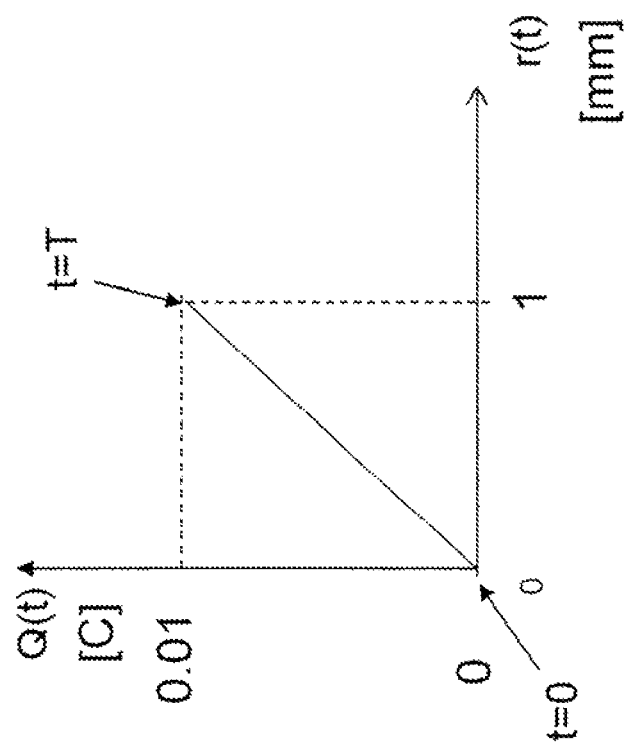
FIG. 15 is a view that shows the outline of a relationship between a displacement change r(t) and a quantity of charge Q(t) in the conductive polymer actuator.

In a state where the displacement of the actuator is stabilized, with a certain voltage (for example, +1.5V) being applied to the actuator, a negative voltage (for example, −1.5 V) is applied to the actuator so that the actuator is displaced in the negative direction. In this case, applying a voltage to the conductive polymer film portion is defined as simply expressing that a voltage is applied to the actuator. FIGS. 14(a), 14(b), and 14(c) respectively indicate time-based changes in the voltage, displacement, and current. Here, the time at which the application of a negative voltage to the actuator is started is defined as $t_0$. Moreover, the time at which the application of the negative voltage to the actuator is completed is defined as $t_0 + T$. Furthermore, a value (charge quantity), obtained by integrating the size of a current value that has been allowed to flow until a period of time t has been elapsed from the time $t_0$ corresponding to the start of the application of the negative voltage to the actuator, is defined as $Q(t)$. The size (displacement change) of change in displacement during a period from the time $t_0$ corresponding to the start of the application of the negative voltage to the actuator up to a lapse of time t is defined as $r(t)$. At this time, the relationship between the displacement change r(t) and the charge quantity Q(t) is substantially indicated as shown in FIG. 15. As can be seen from FIG. 15, the displacement change in the actuator upon application of a constant voltage is substantially proportional to the charge quantity that is allowed to flow at this time. That is, by measuring the charge quantity flowing through the actuator upon application of a constant voltage to the actuator, the displacement change in the actuator at this time can be detected. FIGS. 14 and 15 exemplify a state in which the size of the displacement change is 1 mm for a period of time from time $t_0$ to time $t_0+T$, with the charge quantity flowing thereto being set to 0.01 C.

In the first embodiment, for example, the inclination of the graph of FIG. 15 is defined as the displacement/charge quantity conversion value.

<Comparison with Conventional Method>

In comparison with the method of Patent Document 1, the control method for a conductive polymer actuator of the first embodiment of the present invention does not need to install resistivity detecting electrodes. Moreover, since it does not need to insulate among a plurality of resistivity detecting electrodes, no insulators are required to be installed between the control electrode 103 and the conductive polymer film portion 101. From these points, the control method for a conductive polymer actuator of the first embodiment of the present invention can be realized by using a simpler structure in comparison with the method of Patent Document 1.

Moreover, in the structure of Patent Document 2 (JP-A-2006-87182) or Patent Document 3 (JP-A-2001-54899), the length of a conductive polymer film is detected by a sensor (an eddy current-type displacement sensor, a laser sensor, or the like) so as to carry out a controlling process; however, since the method for controlling a conductive polymer actuator of the first embodiment of the present invention does not need to install such a sensor, it is possible to realize the method by using a simpler structure in comparison with these.

As described above, in the method for controlling a conductive polymer actuator of the first embodiment of the present invention, it becomes possible to accurately control the displacement of a conductive polymer actuator by using a simpler structure in comparison with the conventional method, such as Patent Document 1, Patent Document 2, Patent Document 3, or the like.

Moreover, for example, in the above-mentioned Non-Patent Document 1 or the like, upon applying a voltage to a conductive polymer actuator so as to drive the actuator, a relationship between the charge quantity flowing for a certain period of time and the amount of change in displacement during the period of time is taken into consideration. That is, it implies that based on a charge quantity flowing for a certain period of time, the amount of change in displacement during the period of time can be found. However, in the case where the conductive polymer actuator is driven for a long period of time, it is not possible to accurately find the amount of change in displacement by using the method of Non-Patent Document 1 for the reason described below.

As has been generally known, two components are found in the charge quantity flowing through the conductive polymer actuator. The first charge quantity component is a component that accumulates in the capacitor component of the actuator to generate a displacement of the actuator. The second charge quantity component is a component that is allowed to flow through the resistivity component of the actuator to have no relationship with the displacement of the actuator. By measuring the first charge quantity component, it is possible to find the relative displacement amount of the actuator; however, the charge quantity found by the measurements also contains the second charge quantity component, and this value causes noise upon finding a relative displacement amount. Moreover, in addition to this, various noises (errors) are generally contained in the measurements or calculations. Therefore, in the case where a conductive polymer actuator is driven for a long period of time, since the noise (error) is accumulated for a long period of time, a large error is contained in the amount of change in displacement found by the method of Non-Patent Document 1.

Moreover, always measuring a current, when the power supply of the actuator is turned off, is not considered to be practical. However, even when the power supply of the actuator is turned off, the conductive polymer film has such a characteristic that the displacement amount is slightly changed due to an effect of ion diffusion. Consequently, even by using the method of Non-Patent Document 1, it is impossible in practice to always measure the amount of change in displacement.

In the case where the conductive polymer actuator is composed of only pure capacitor components, the increase or reduction of charge accumulated in the conductive polymer can be measured only by using the current flowing through the outside of the actuator operation unit, and the displacement of the actuator can be estimated from the charge accumulated in the conductive polymer. In the actual actuator, however, since there is a leakage current flowing through the resistivity components, it is impossible to accurately measure the increase or reduction of charge accumulated in the conductive polymer only by using the current flowing the outside of the actuator operation unit, thereby making it impossible to accurately estimate the displacement of the actuator. In particular, in the case where the power supply is kept turned off for a long time, since a change in displacement due to the leakage current is great, it is actually impossible to always measure the amount of change in displacement by using the method of Non-Patent Document 1.

For the reasons described above, even by the use of the method described in Non-Patent Document 1, it is impossible to accurately find the amount of change in displacement in the case where the actuator is used for a long period of time and also to accurately find the amount of change in displacement in the case where the power supply is kept turned off for a long period of time.

As described above, in comparison with the method of Non-Patent Document 1, the control method for a conductive polymer actuator of the first embodiment of the present invention makes it possible to accurately control the displacement of the conductive polymer actuator.

Second Embodiment

The description of the first embodiment has given a description mainly on an actuator that carries out curving operations; however, the method of the present invention may be applied to an actuator that carries out linear operations. Moreover, the above description has mainly dealt with an anion-driving-type actuator; however, the control method for a conductive polymer actuator according to a second embodiment of the present invention may also be applicable to a cation-driving-type actuator.

Figure 16B:
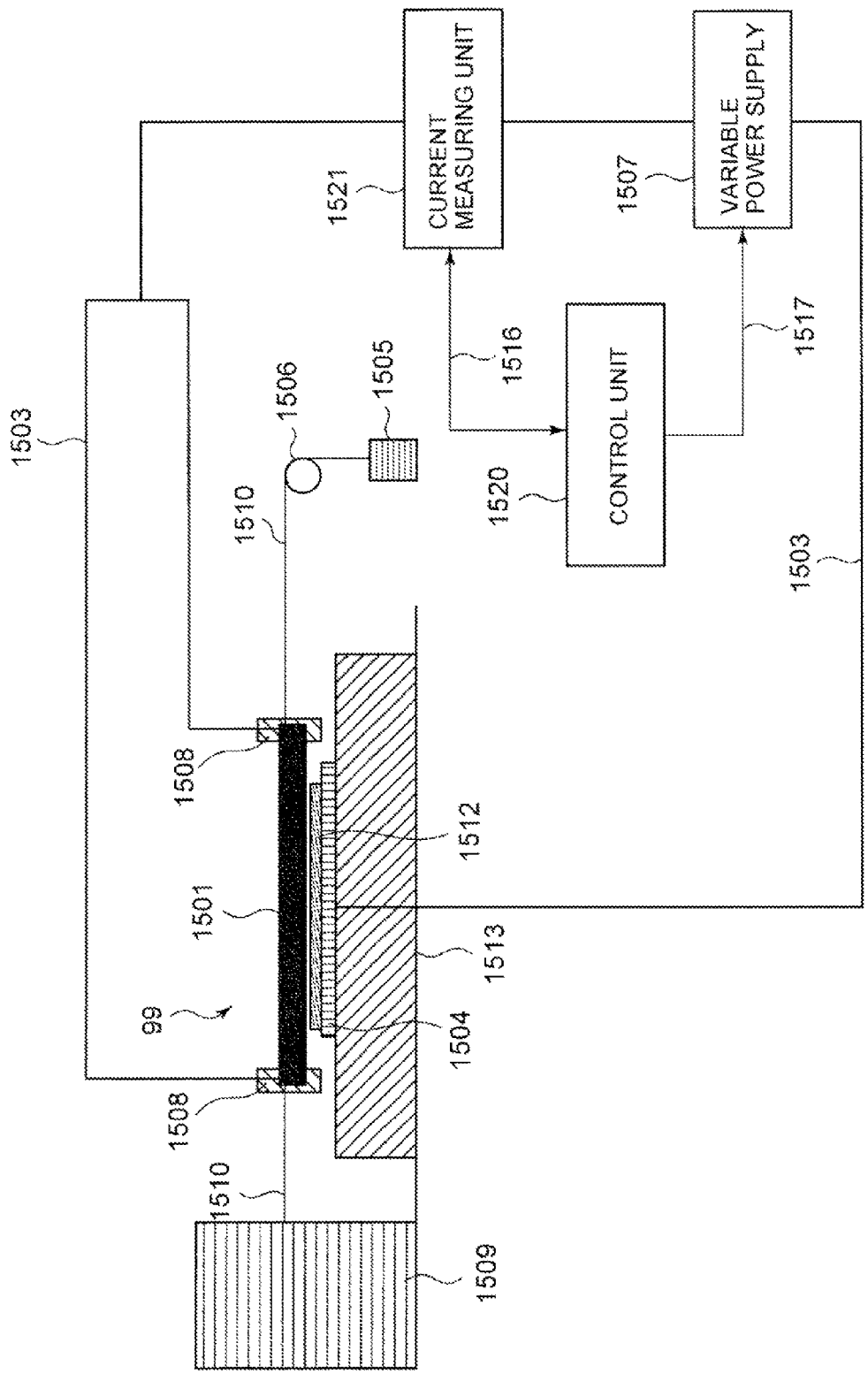
FIG. 16B is a structural view that shows another example of the conductive polymer actuator device that executes an operation in a direct-acting direction in a control method for the conductive polymer actuator according to the second embodiment of the present invention.

FIGS. 16A, 16B, and 16C show block diagrams of a cation-driving-type conductive polymer actuator that carries out operations in a direct-acting direction.

FIG. 16A shows a structure of a conductive polymer actuator in which a conductive polymer film portion 1501 is placed in an ionic solution 1502 serving as another example of the electrolyte portion.

FIG. 16B shows a structure of a conductive polymer actuator in which a polymer gel 1512 is placed between an opposed electrode unit 1504 and a conductive polymer film portion 1501, as still another example of the electrolyte portion.

FIG. 16C shows a structure of a conductive polymer actuator provided with a spring portion 1515 so as to apply an appropriate tension to the conductive polymer film portion 1501.

The description will be given one by one.

First, the structure of FIG. 16A is described.

As described above, FIG. 16A shows the structure in which the conductive polymer film portion 1501 is placed in the ionic solution 1502.

The actuator of FIG. 16A is provided with the conductive polymer film portion 1501, the ionic solution 1502, a wiring unit 1503, the opposed electrode unit 1504, a dead weight 1505, a pulley 1506, a variable power supply 1507, a connecting member 1508, a fixed wall 1509, a connecting string 1510 serving as one example of a connecting line member, a container 1511, a control unit 1520, a current measuring unit 1521 serving as one example of the current detection unit, a first signal line 1516, and a second signal line 1517. The first signal line 1516 is connected with the control unit 1520 and the current measuring unit 1521. The second signal line 1517 is connected with the control unit 1520 and the variable power supply 1507.

The two ends of the conductive polymer film portion 1501 placed in the container 1511 are connected with the connecting string 1510 by the connecting member 1508. The connecting member 1508 and the connecting string 1510 are composed of an insulator. In FIG. 16A, the end on the left side of the conductive polymer film portion 1501 is connected with the connecting string 1510, and the connecting string 1510 of this portion is connected to the fixed wall 1309. In FIG. 16A, the end on the right side of the conductive polymer film portion is connected with the connecting string 1510, and the connecting string 1510 of this portion is connected to the dead weight 1505 through the pulley 1506. The container 1511 is filled with the ionic solution 1502, and the conductive polymer film portion 1501 is placed in the ionic solution 1502. Moreover, the opposed electrode 1504 is placed on the bottom face of the container 1511. The opposed electrode 1504 is made of, for example, platinum having a network shape. The wiring unit 1503 is connected to the two ends of the conductive polymer film portion 1501 and the opposed electrode 1504, as shown in FIG. 16A. The wiring unit 1503 and the variable power supply 1507 are connected with each other as shown in FIG. 16A so that a circuit is formed. That is, the current measuring unit 1521 and the variable power supply 1507 are connected via the wiring unit 1503 so as to be arranged between the two ends of the conductive polymer film portion 1501 and the opposed electrode 1504.

The conductive polymer film portion 1501 is a polypyrrole film that is formed by electrolytic polymerization in which the electrolytic polymerizing process is carried out, for example, in a polypropylene carbonate (PC) solution of tetrabutylammonium phosphoric acid hexafluoride (TBA.PF$_6$), and its thickness is about 10 μm, and its size is about 5 mm in width and about 35 mm in length. Moreover, the following description will discuss the case where EMI.TFSI (ethylmethyl immidazolium.trifluoromethane sulfonyl imide) serving as an ionic solution is used as the electrolytic solution. In this example, as has been already described, doping and undoping processes of EMI ions (cations) mainly form a deformation mechanism. In this case, even in a undoped state of EMI ions (cations), comparatively high conductivity can be maintained. This is presumably because, since phosphoric acid hexafluoride ions (PF$_6^-$) are contained in polypyrrole even in this state, the comparatively high conductivity is maintained. In the examples of the first embodiment, since the conductivity of the conductive polymer film is lowered in the undoped state of anions, a control electrode needs to be installed near the film so as to efficiently apply a voltage to the conductive polymer film. However, in the case of the cation-driving actuator as shown in the example of FIG. 16A and an example of FIG. 16B which will be described later, since the conductivity of the conductive polymer film is always kept in a high level, the control electrode is not required so that a simple structure is advantageously obtained.

In the case where a positive voltage is applied to the conductive polymer film portion 1501 by the variable power supply 1507, cations (plus ions) are transferred from the inside of the conductive polymer film portion 1501 into the ionic solution 1502 so that the conductive polymer film portion 1501 is contracted. In contrast, in the case where a negative voltage is applied to the conductive polymer film portion 1501, cations (plus ions) are transferred from the ionic solution 1502 into the conductive polymer film portion 1501 so that the conductive polymer film portion 1501 is expanded.

FIG. 17 is a view that shows a specific structure of the control unit 1520. The control unit 1520 is provided with a step control unit 1530, a displacement amount estimation unit 1531, a current value/displacement amount conversion table 1532, and a desired charge quantity calculation unit 1533.

In this case, a control device, which is capable of carrying out the method for controlling the actuator according to the second embodiment, is provided with: a displacement amount acquiring unit which, upon application of a voltage to the conductive polymer film portion 1501 of a conductive polymer actuator operation unit 99 through the electrode 1504, acquires a current value flowing through the conductive polymer film portion 1501, and obtains a displacement amount of the conductive polymer actuator operation unit 99 based on the acquired current value, and a displacement amount adjusting unit which finds a difference between the displacement amount of the conductive polymer actuator operation unit 99 acquired by the displacement amount acquiring unit and the desired value for the displacement amount, and applies a voltage to the conductive polymer film portion 1501 based on the difference so that the displacement amount of the conductive polymer actuator operation unit 99 can be adjusted. More specifically, the displacement amount acquiring unit is constituted by, for example, a current measuring unit 1521, a displacement estimation unit 1531, and a current value/displacement amount conversion table 1532. More specifically, the displacement amount adjusting unit is constituted by, for example, a desired charge quantity calculation unit 1533, a step control unit 1530, and a current measuring unit 1521.

The step control unit 1530 transmits a first step starting signal to the variable power supply 1507 and the current measuring unit 1521 at a predetermined timing.

When the variable power supply 1507 receives the first step starting signal from the step control unit 1530, it applies a predetermined driving voltage to the conductive polymer film portion 1501. The timing at which the first step starting signal is transmitted corresponds to the timing at which the first step S1, described in the first embodiment, is started, and also corresponds to, for example, the timing at which, from the off-state of the variable power supply 1507 of the actuator, the operation is again started.

Upon receipt of the first step starting signal from the step control unit 1530, the current measuring unit 1521 measures a current flowing through the conductive polymer film portion 1501, that is, the wiring unit 1503, and transmits the results of current measurements to the displacement amount estimation unit 1531 placed inside the control unit 1520.

Upon receipt of the results of current measurements from the current measuring unit 1521, the displacement amount estimation unit 1531 refers to the current value/displacement amount conversion table 1517, estimates the displacement amount from the measured current value, and outputs the resulting value to the desired charge quantity calculation unit 1533 as an estimated displacement amount.

Upon receipt of the estimated displacement amount from the displacement amount estimation unit 1531, the desired charge quantity calculation unit 1533 calculates the desired charge quantity based on the following equation 1 (the same equation as the aforementioned equation 1).

Desired charge quantity=(Estimated displacement amount−Desired value of displacement amount)× Displacement/Charge quantity conversion value    (Equation 1)

In this case, the displacement amount/charge quantity conversion value is a predetermined value, and the desired charge quantity calculation unit 1533 keeps this value. When the desired charge quantity calculation unit 1533 calculates the desired charge quantity, it outputs the resulting value to the current measuring unit 1521 and the step control unit 1530.

Upon receipt of the desired charge quantity from the desired charge quantity calculation unit 1533, the step control unit 1530 outputs a fourth step starting signal to the variable power supply 1507. Upon receipt of the fourth step starting signal, the variable power supply 1507 starts applying a predetermined voltage to the conductive polymer film portion 1501.

On the other hand, upon receipt of the desired charge quantity from the desired charge quantity calculation unit 1533, the current measuring unit 1521 starts measuring the current value. Moreover, the current measuring unit 1521 integrates the current value, and when the integrated value becomes equal to the desired charge quantity, it outputs a fourth step completion signal to the step control unit 1530. Upon receipt of the fourth step completion signal from the current measuring unit 1521, the step control unit 1530 outputs the fourth step completion signal to the variable power supply 1507. Upon receipt of the fourth step completion signal, the variable power supply 1507 completes the application of a voltage to the conductive polymer film portion 1501.

As described above, in the conductive polymer actuator according to the second embodiment, by carrying out the above-mentioned control method, the displacement of the actuator can be accurately controlled to a predetermined value. Moreover, since no sensors, such as a laser displacement gauge, need to be installed, a simple structure can be advantageously achieved.

Additionally, the value of the current value/displacement amount conversion table 1532 can be determined in the same manner as in the first embodiment.

Figure 18:
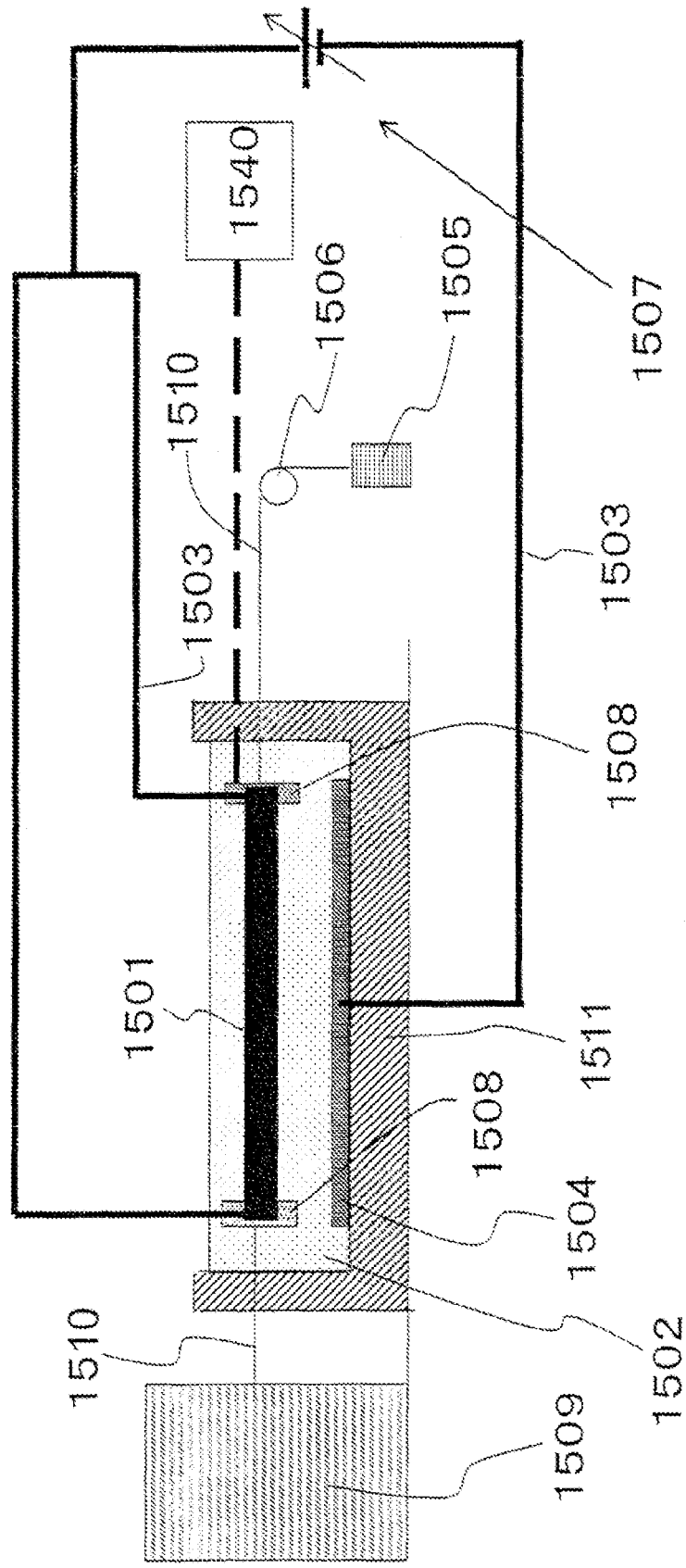
FIG. 18 is a view that shows a structure of a device used for carrying out basic experiments on a direct-acting-type conductive polymer actuator.

FIG. 18 shows a device that carries out basic experiments on a direct-acting-type conductive polymer actuator.

Figure 19:
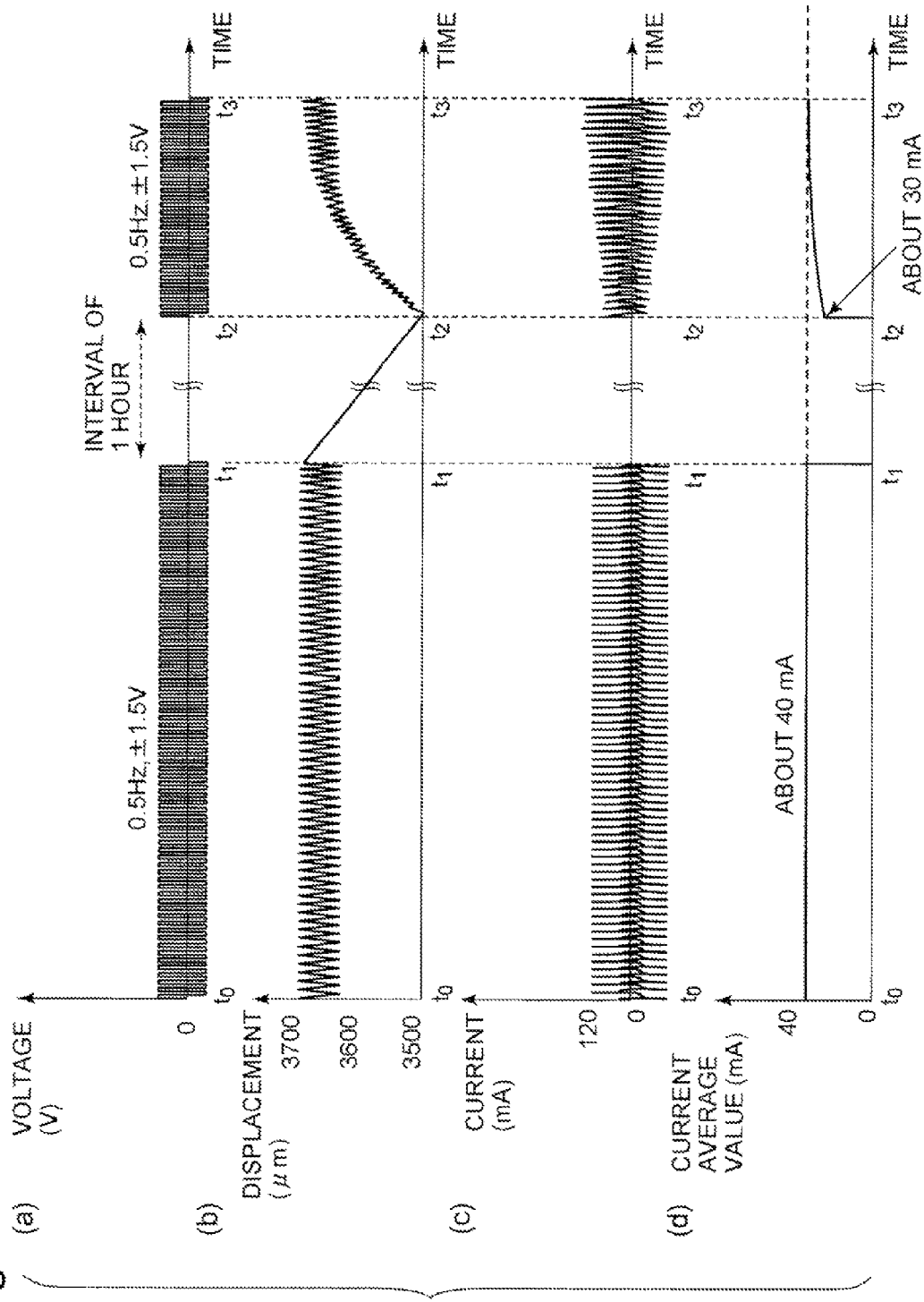
FIG. 19 is a view that shows a relationship between each of a driving voltage, a displacement, a current, and a current average value, and time in a cation-driving-type actuator.
Figure 20:
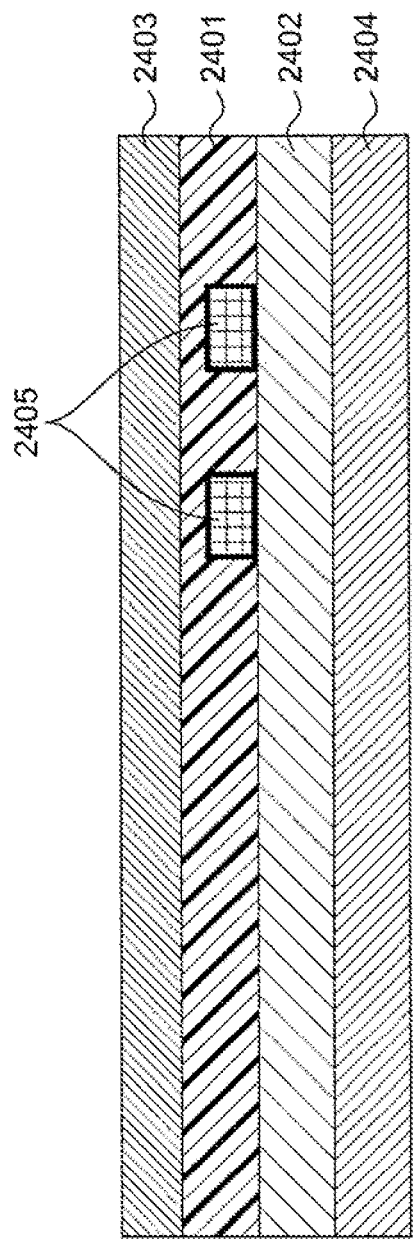
FIG. 20 is a view that shows a structure of a conventional conductive polymer actuator.

In the structure shown in FIG. 18, the following description will discuss the case where a dead weight 1505 of about 5 g in weight is connected to the conductive polymer film portion 1501 so that the displacement of the connecting member 1508 is measured by a laser displacement gauge 1540. At this time, FIG. 19 shows the outline of relationships among the driving voltage, the current, and the displacement. In this case, the time-based change in the applied driving voltage is the same as those shown in FIGS. 4A and 4B. That is, it is supposed that a driving voltage having a frequency of 0.5 Hz and ±1.5 V with a rectangular waveform is applied, and the power supply is turned off for one hour mid way during the operation, and the same driving voltage having the rectangular waveform is then again applied thereto. As shown in FIG. 19, the results given in FIG. 19 indicates substantially the same tendency as those of FIGS. 4A and 4B. However, in general, the direct-acting-type actuator as shown in FIG. 16A tends to have a slightly smaller width in displacement, in comparison with a curving type actuator as shown in FIG. 1. Based on the results shown in FIG. 19, it is possible to determine the value of the current value/displacement amount conversion table 1532 by using the same method as that of the first embodiment.

FIG. 16B shows a structure in which a polymer gel 1512 is placed between the opposed electrode 1504 and the conductive polymer film portion 1501. The polymer gel 1512 is a material formed by gelling an ionic solution, for example, such as EMI.TFSI.

This actuator is provided with the conductive polymer film portion 1501, a wiring unit 1503, the opposed electrode unit 1504, a dead weight 1505, a pulley 1506, a variable power supply 1507, a connecting member 1508, a fixed wall 1509, a connecting string 1510, a polymer gel 1512, a mounting base 1513, a control unit 1520, a current measuring unit 1521, a first signal line 1516, and a second signal line 1517.

The conductive polymer film portion 1501, the wiring unit 1503, the opposed electrode 1504, the dead weight 1505, the pulley 1506, the variable power supply 1507, the connecting member 1308, the fixed wall 1509, the connecting string 1510, the control unit 1520, the current measuring unit 1521, the first signal line 1516, and the second signal line 1517 execute the same functions as those of the corresponding members in the actuator of FIG. 16A.

The polymer gel 1512 contains ions so that in the case where a positive voltage is applied to the conductive polymer film portion 1501 by the variable power supply 1507, cations (plus ions) are transferred from the inside of the conductive polymer film portion 1501 to the polymer gel 1512, thereby allowing the conductive polymer film portion to contract. In contrast, in the case where a negative voltage is applied to the conductive polymer film portion 1501, cations (plus ions) are transferred from the polymer gel to the inside of the conductive polymer film portion 1501, thereby allowing the conductive polymer film portion 1501 to expand. The opposed electrode unit 1504 is placed on the mounting base 1513. The mounting base 1513 is made from an insulator.

In this structure, since the entire structure is composed of solid components, the resulting effect is that the structure is easily handled. In this structure also, the control method shown in the first embodiment may be applicable.

FIG. 16C shows a structure in which a spring portion 1515 is installed so as to apply an appropriate tension to the conductive polymer film portion 1501. In this example, the spring portion 1515 and a movable member 1516, which are connected by the connecting string 1510, are placed at the end on the right side of the conductive polymer film portion. That is, the spring portion 1515 is placed between a second fixed wall 1509B and the end of the connecting string 1510. The movable member 1516 is secured to the connecting string 1510 between the end on the right side of the conductive polymer film portion and the end of the spring portion 1515. Therefore, by allowing the conductive polymer film portion 1501 to expand/contract by a voltage application from the variable power supply 1507 to the conductive polymer film portion 1501, the movable member 1516 is shifted laterally through the connecting string 1510. The spring portion 1516 is kept in an expanded state from a natural length in its initial state, and has a function for applying an appropriate tension to the conductive polymer film portion 1501.

The second embodiment has given the description on the direct-acting type actuator; however, as described in the first embodiment, in the case of a curving type actuator also, by installing the control unit 92 and the current measuring unit 91 therein, the same functions as those of the second embodiment can be achieved. Moreover, these embodiments can be applied to any electronic device including these actuators. As one of examples, the conductive polymer actuator may be used for a pump having a diaphragm. As another example, an auto-focusing mechanism that changes the position of a lens and also carries but positioning and holding operations, by using a conductive polymer actuator, or a pan-tilt mechanism that changes an image-pickup direction of the camera and also carries out positioning and holding operations of the image-pickup direction and position, by using a conductive polymer actuator, may be proposed.

Additionally, the above embodiments have exemplified the actuator of the cation-driving type and also the direct-acting type; however, as described earlier, the method for controlling a conductive polymer actuator of the present invention is applicable to both of the cation-driving-type conductive actuator and the anion-driving-type conductive actuator. In the cation-driving type actuator, since the resistivity of the conductive polymer film can be suppressed to a low level independent of the applied voltage, and since no control electrode needs to be installed, a simple structure can be achieved.

Additionally, in the cation-driving-type conductive polymer actuator, the conductivity of the conductive polymer is kept substantially constant independent of an expansion/contraction state, in some cases. In such a case, the method of Patent Document 1 cannot be applied.

Moreover, among the above-mentioned various embodiments or modified embodiments, arbitrary embodiments or modified embodiments may be combined with one another on demand so that the respective effects can be exerted and obtained.

INDUSTRIAL APPLICABILITY

The conductive polymer actuator device of the present invention, and the control device and the control method for the conductive polymer actuator of the present invention are desirably utilized for electronic devices including artificial muscles or electronic parts, and the control device and control method thereof. As the electronic devices including the conductive polymer actuator, examples thereof include pumps or lens driving devices for a small-size camera, which use the conductive polymer film as a diaphragm.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A control device for a conductive polymer actuator that allows a conductive polymer film portion, an electrolyte portion that is placed at a position in contact with the conductive polymer film portion, and an electrode that is placed at a position in contact with the electrolyte portion to constitute an actuator operation unit, comprising:
   a displacement amount acquiring unit that, upon application of a voltage between the conductive polymer film portion and the electrode, at a predetermined timing after an applied voltage between the conductive polymer film portion and the electrode has been released therebetween, acquires a current value flowing through the conductive polymer film portion, and acquires a displacement amount of the actuator operation unit based on the acquired current value; and
   a displacement amount adjusting unit that adjusts the displacement amount of the actuator operation unit, based on the displacement amount of the actuator operation unit acquired by the displacement amount acquiring unit.

2. The control device for a conductive polymer actuator according to claim 1, wherein the displacement amount acquiring unit comprises:
   a current detection unit that, in a case where, upon starting a voltage application between the conductive polymer film portion and the electrode, a voltage having a certain waveform is applied between the conductive polymer film portion and the electrode, detects a current value flowing through the conductive polymer film portion; and
   a displacement amount calculation unit that calculates a displacement amount of the actuator operation unit based on the current value detected by the current detection unit.

3. The control device for a conductive polymer actuator according to claim 1, wherein the displacement amount acquiring unit comprises:
   a current detection unit that, in a case where, while the applied voltage between the conductive polymer film portion and the electrode is released, a voltage having a certain waveform is applied between the conductive polymer film portion and the electrode for every certain fixed period of time, detects a current value flowing through the conductive polymer film portion; and
   a displacement amount calculation unit that calculates a displacement amount of the actuator operation unit based on the current value detected by the current detection unit.

4. The control device for a conductive polymer actuator according to claim 1, wherein, when a continuous period of time of the voltage released state exceeds a fixed period of time, the displacement amount acquiring unit applies a voltage between the conductive polymer film portion and the electrode at a predetermined timing thereafter, and detects a current value flowing through the conductive polymer film portion so that, based on the detected current value, a displacement amount of the actuator operation unit is acquired.

5. A conductive polymer actuator device comprising:
   a conductive polymer actuator that allows a conductive polymer film portion, an electrolyte portion that is placed at a position in contact with the conductive polymer film portion, and an electrode that is placed at a position in contact with the electrolyte portion to constitute an actuator operation unit;
   a voltage applying unit that applies a voltage between the conductive polymer film portion and the electrode;
   a release-time measuring unit that measures a period of time during a state in which the applied voltage between the conductive polymer film portion and the electrode has been released;
   a displacement amount acquiring unit that, in a case where the measured time of the release-time measuring unit exceeds a predetermined period of time, upon application of a voltage having a certain waveform between the conductive polymer film portion and the electrode by the voltage applying unit at a predetermined timing, acquires a current value flowing through the conductive polymer film portion, and acquires a displacement amount of the actuator operation unit based on the acquired current value; and a displacement amount adjusting unit that adjusts the displacement amount of the actuator operation unit based on the displacement amount of the actuator operation unit acquired by the displacement amount acquiring unit.

6. The conductive polymer actuator device according to claim 5, wherein the displacement amount adjusting unit comprises:

a displacement amount estimation unit that, based on the current value acquired by the displacement amount acquiring unit, estimates the displacement amount of the actuator by reference to a displacement amount/charge quantity conversion value preliminarily stored in a current value/displacement amount conversion table;

a desired charge quantity calculation unit that calculates a difference between the displacement amount estimated by the displacement amount estimation unit and a desired value of the displacement amount, and then calculates a desired charge quantity from the difference in the displacement amount thus calculated; and an application control unit that, based on the desired charge quantity calculated by the desired charge quantity calculation unit, controls the voltage applying device to apply a voltage so that the displacement amount of the actuator is adjusted.

7. The conductive polymer actuator device according to claim 5, wherein the desired charge quantity calculation unit of the displacement amount estimation unit calculates the charge quantity by integrating the current value acquired by the displacement amount acquiring unit.

8. A control method for a conductive polymer actuator that allows a conductive polymer film portion, an electrolyte portion that is placed at a position in contact with the conductive polymer film portion, and an electrode that is placed at a position in contact with the electrolyte portion to constitute an actuator operation unit, comprising:

upon applying a voltage between the conductive polymer film portion and the electrode at a predetermined timing after the applied voltage between the conductive polymer film portion and the electrode has been released, acquiring a current value flowing through the conductive polymer film portion, and then allowing a displacement amount acquiring unit to acquire a displacement amount of the actuator operation unit based on the acquired current value; and finding a difference between the displacement amount of the actuator operation unit thus acquired and a desired value of the displacement amount, and then applying a voltage determined based on the difference between the conductive polymer film portion and the electrode so as to allow a displacement amount adjusting unit to adjust the displacement amount of the actuator.

* * * * *